(12) United States Patent
Ueda et al.

(10) Patent No.: US 7,005,810 B2
(45) Date of Patent: Feb. 28, 2006

(54) MOTOR DRIVING APPARATUS

(75) Inventors: Mitsuo Ueda, Nishinomiya (JP);
Hideki Nakata, Shijyounawate (JP);
Makoto Yoshida, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 169 days.

(21) Appl. No.: 10/781,818

(22) Filed: Feb. 20, 2004

(65) Prior Publication Data

US 2004/0183487 A1    Sep. 23, 2004

(30) Foreign Application Priority Data

Feb. 21, 2003   (JP) .............................. 2003-045015

(51) Int. Cl.
*G05B 13/04*    (2006.01)
*H02P 7/00*    (2006.01)
(52) U.S. Cl. ..................... 318/114; 318/127; 318/128
(58) Field of Classification Search ................ 318/114, 318/127, 128
See application file for complete search history.

(56) References Cited

U.S. PATENT DOCUMENTS

| 4,772,838 A | | 9/1988 | Maresca ..................... 318/687 |
| 5,342,176 A | | 8/1994 | Redlich ..................... 417/212 |
| 5,909,018 A | * | 6/1999 | Vecchiotti et al. .......... 187/393 |
| 6,211,634 B1 | * | 4/2001 | Heller et al. ................ 318/254 |
| 6,525,498 B1 | * | 2/2003 | Zalkin et al. ............... 318/432 |
| 6,747,431 B1 | * | 6/2004 | Marra et al. ................ 318/599 |

FOREIGN PATENT DOCUMENTS

| EP | 0952347 | 10/1999 |
| EP | 1063760 | 12/2000 |
| JP | 8-508558 | 9/1996 |
| JP | 11-324911 A | 11/1999 |
| JP | 2002-354864 A | 12/2002 |
| WO | 94/23204 | 10/1994 |

* cited by examiner

*Primary Examiner*—Darren Schuberg
*Assistant Examiner*—Judson H. Jones
(74) *Attorney, Agent, or Firm*—Wenderoth, Lind & Ponack, L.L.P.

(57) ABSTRACT

An apparatus for driving a linear vibration motor that employs a proper motor thrust constant value corresponding to each linear vibration motor at position calculation for obtaining the position of the mover of the linear vibration motor, thereby increasing the accuracy of the position calculation. This motor driving apparatus includes a motor driver for applying a DC voltage to the linear vibration motor, and a thrust detection unit for detecting a thrust of the mover, which is generated by the application of the DC voltage to the linear vibration motor, and calculates the thrust constant of the linear vibration motor according to an arithmetic operation of dividing the mover thrust detected by the thrust detection unit, by a value of a DC current that is supplied to the linear vibration motor due to the application of the DC voltage to the linear vibration motor.

11 Claims, 14 Drawing Sheets

MOTOR DRIVING APPARATUS

FIELD OF THE INVENTION

The present invention relates to motor driving apparatuses and, more particularly, to a motor driving apparatus for driving a linear vibration motor including a mover and a spring member that supports the mover.

BACKGROUND OF THE INVENTION

Conventional equipment using a linear vibration motors include vibration generators that informs incoming calls by mechanical vibration, such as cellular phones, compressors that compress and circulate gas or liquid, and reciprocating electric razors. The compressors and reciprocating electric razors use the linear vibration motors as their driving sources.

A typical linear vibration motor has a structure of a single-phase sync motor, i.e., it has a mover comprising a permanent magnet and a stator obtained by winding a coil around an iron core, and the mover reciprocates when an AC voltage is applied to the coil.

When generating vibrations by the reciprocating motion of the mover, a strong electromagnetic force is needed. However, an energy required for driving the linear vibration motor can be suppressed by forming a spring vibration system including the mover and a spring member supporting the mover. That is, in the linear vibration motor in which the mover is supported by the spring member, the spring vibration system including the mover is vibrated at its natural frequency (resonance frequency), whereby the linear vibration motor can be driven with a relatively low energy.

In the linear vibration motor, however, when the stroke length of the mover becomes larger than a predetermined allowable value, a problem such as a collision between the mover and the motor housing or breakage of the spring member may occur. Therefore, the position of the mover must be detected and controlled.

Japanese Published Patent Application No. Hei. 11-324911 discloses a driving apparatus for driving a linear vibration motor, which includes a detector such as a position sensor for detecting the position of the mover of the linear vibration motor, and reduces the output of the linear vibration motor when the stroke length of the mover becomes larger than a predetermined allowable value, i.e., decreases the amplitude value of the voltage or current applied to the linear vibration motor, thereby preventing the linear vibration motor from being broken due to a collision between the mover and the motor housing or extension of the spring member over a critical value.

As the above-mentioned position detector, there is employed a sensor that can detect the degree of displacement of the mover with respect to a mover reference position such as a mover neutral position (the mover displacement amount) without contacting the mover of the linear vibration motor. For example, a displacement gauge using an eddy current system, a displacement gauge using a differential transformer, or the like is employed.

However, when such sensor is employed, not only the production cost of the linear vibration motor is increased but also a space for mounting the sensor is needed, which leads to an increase in the size of the housing of the linear vibration motor. Further, when considering the compressor as an application of the linear vibration motor, such sensor may be used with being exposed to a high-temperature and high-pressure gas. Therefore, a problem on reliability of the sensor itself occurs, in other words, a sensor that can be reliably used in high-temperature and high-pressure atmospheres is required.

So, as a method for detecting the position of the mover, Japanese Unexamined Patent Publication No. Hei. 8-508558 proposes a method of directly measuring driving current and voltage that are supplied to the linear vibration motor, and deriving the position of the mover on the basis of the measured values, without using a position sensor placed in the linear vibration motor.

Hereinafter, a description will be given of the mover position detection method used for a linear Vibration motor, which is described in the above-mentioned application. The linear vibration motor described in this application is applied to a linear compressor. Therefore, this application describes a case where a mover that reciprocates within a cylinder so as to compress gas in the cylinder constituting the linear compressor is prevented from colliding against a cylinder head.

FIG. 13 is a diagram illustrating an equivalent circuit of a linear vibration motor in which a mover reciprocates.

In FIG. 13, L indicates an equivalent inductance [H] of a coil as a component of the linear vibration motor, and R indicates an equivalent resistor [Ω] of the coil. V indicates an instantaneous voltage [V] applied to the linear vibration motor, and I indicates a current [A] applied to the linear vibration motor. Further, α×v indicates a induced electromotive voltage [V] which is generated when the linear motor is driven, wherein a is a thrust constant [N/A] of the linear vibration motor, and v is an instantaneous velocity [m/s] of the linear vibration motor.

Here, the thrust constant α of the linear vibration motor indicates a force [N] which is generated when a unit current [A] is passed through the linear vibration motor. While the unit of the thrust constant α is expressed by [N/A], this unit is equivalent to [Wb/m] or [V·s/m].

The equivalent circuit shown in FIG. 13 is derived from the Kirchhoff's low, and an instantaneous velocity v [m/s] of the mover of the linear vibration motor is obtained from the equivalent circuit.

That is, under the driving state of the linear motor, the voltage (V) applied to the linear vibration motor is balanced with the sum of a dropped voltage (I×R)[V] due to the equivalent resistance of the coil of the linear vibration motor, a dropped voltage (L·dI/dt)[V] due to the equivalent inductance of the coil, and the induced electromotive voltage (α×v)[V] generated when driving the linear vibration motor, and the following formula (1) is derived.

$$v = \frac{1}{\alpha}\left(V - R \times I - L\frac{dI}{dt}\right) \qquad \text{Formula (1)}$$

The coefficients α[N/A], R[Ω], and L[H] used in formula (1) are constants unique to the motor, and these constants are known values. Accordingly, the instantaneous velocity v[m/s] can be obtained from these constants and the applied voltage V[V] and current I[A] which are measured, on the basis of formula (1).

Further, the mover displacement (a distance from an undefined reference position to the mover) x[m] is obtained by time integration of the instantaneous velocity v[m/s] as shown by the following formula (2). In formula (2), the constant Const. is a mover displacement at the start of integration.

$$x = \int v\,dt + Const. \qquad \text{Formula (2)}$$

As described above, in the mover position detection method as proposed in the above application, the measured value V of the applied voltage and the measured value I of the applied current associated with the linear vibration motor are subjected to arithmetic processing including differentiation based on formula (1) to obtain the instantaneous velocity v of the mover, and further, the instantaneous velocity v is subjected to arithmetic processing including integration based on formula (2), whereby the mover displacement x can be obtained.

However, the mover displacement x obtained by the arithmetic processing based on formulae (1) and (2) is a displacement with respect to a certain position on the mover axis, and a distance from the cylinder head which may be collided by the mover to the mover top dead point cannot be obtained directly from the displacement x.

To be more specific, when the compressor to which the linear vibration motor is applied is under loaded condition, the mover center position (mover amplitude center position) in the mover reciprocating motion is offset with respect to the mover neutral position (i.e., the mover amplitude center position when the pressure in the compression chamber is equal to the back pressure) due to the pressure of a cooling medium gas, and the mover reciprocates around the offset mover amplitude center position. In other words, the mover displacement x obtained by formula (2) includes an average component corresponding to the degree of the offset.

However, every actual analog or digital integrator does not perform ideal integration processing for outputting a perfect response signal with respect to a constant or a DC input, but it is restricted in responding to a DC input. Therefore, an actual integrator cannot subject the mover displacement x to integration processing in which its average component is reflected. The reason why the DC response of the actual integrator is restricted is because the output of the integrator should be prevented from being saturated by unavoidable DC components in the input signal.

As a result, the mover displacement x[m] obtained by the integration processing based on formula (2) using the actual integrator is not a displacement from which an actual distance between the mover and the housing cannot be obtained directly, but a displacement simply indicating the mover position with reference to a certain point on the mover axis.

Therefore, the mover displacement x[m] obtained from formula (2) is converted into a mover displacement x' indicating a mover position with respect to the mover amplitude center position. Further, using the converted mover displacement x', arithmetic processing for obtaining a mover displacement with reference to the cylinder head, which indicates the mover amplitude center position, is carried out.

Hereinafter, these arithmetic processings will be described in more detail.

FIG. 14 is a diagram schematically illustrating the mover position in the linear vibration motor.

Initially, three coordinate systems shown in FIG. 14, i.e., a first coordinate system X, a second coordinate system X', and a third coordinate system X'', will be briefly described.

The first coordinate system X is a coordinate system expressing the mover displacement x and it has, as an origin (x=0), a certain point Paru on the mover axis. Accordingly, the absolute value of the displacement x indicates the distance from the point Paru to the mover front end position P.

The second coordinate system X' is a coordinate system expressing the mover displacement x' and it has, as an origin (x'=0), the mover amplitude center position Pav. Accordingly, the absolute value of the displacement x' indicates the distance from the amplitude center position Pav to the mover front end position P.

The third coordinate system X'' is a coordinate system expressing the mover displacement x'' and it has, as an origin (x''=0), the cylinder head position Psh on the mover axis. Accordingly, the absolute value of the displacement x'' indicates the distance from the cylinder head position Psh to the mover front end position P.

Next, an arithmetic operation for obtaining the mover displacement x'' will be described.

A mover position (mover top dead point position) Ptd in which the mover is closest to the cylinder head is indicated by a displacement xtd on the first coordinate system X, and a mover position (mover bottom dead point position) Pbd in which the mover is farthest from the cylinder head is indicated by a displacement xbd on the first coordinate system X. Then, a mover stroke Lps[m] is obtained from a difference between the displacement xtd corresponding to the mover top dead point position Ptd on the first coordinate system X and the displacement xbd corresponding to the mover bottom dead point position Pbd on the first coordinate system X.

Further, the mover amplitude center position Pav in the state where the mover is reciprocating is a position which is apart from the displacement xtd of the mover position (mover top dead point position) Ptd in which the mover is the closest to the cylinder head, by a length (Lps/2) equal to half the mover stroke Lps[m], away from the cylinder head. Accordingly, the mover amplitude center position Pav is expressed by a displacement xav (=(xbd−xtd)/2) on the first coordinate system X.

Further, when the constant Const. in formula (2) is 0, a new function that indicates the mover front end position P by the mover displacement x'[m] is derived with the mover amplitude center position Pav as a reference (origin), in other words, on the second coordinate system X'.

Subsequently, a description will be given of a method for obtaining the mover displacement xav'' indicating a distance from the cylinder head position Psh to the mover amplitude center position Pav on the third coordinate system X'' with the cylinder head position Psh as an origin.

Under the state where the linear compressor draws in a cooling medium gas (suction state), i.e., under the state where the inlet valve is open, both of the pressure in the compression chamber and the pressure on the back of the mover are equal to the cooling medium inlet pressure. This is because the linear compressor is constructed so that the differential pressure becomes zero under the state where the inlet valve is open. In this state, a force from the pressure of the cooling medium that acts on the mover can be ignored. That is, in this state, the forces acting on the mover are only the repulsive force of the spring that is generated by bending of the support spring and the electromagnetic force that is generated by applying a current to the linear vibration motor. According to the Newton's low of motion, the sum of these forces is equal to the product of the total mass of the movable member that is moving, and its acceleration.

Accordingly, under this state, the following formula (3) holds as an equation of motion relating to the movable member.

$$m \times a = \alpha \times I - k(x' + xav'' - xini'') \quad \text{Formula (3)}$$

In formula (3), m is the total mass [kg] of the movable member that is reciprocating, a is the instantaneous acceleration [m/s/s] of the movable member, and k is the spring constant [N/m] of the support spring that is incorporated in the linear vibration motor. Further, xav" is the above-mentioned displacement on the third coordinate system X", which indicates the mover amplitude center position, and the absolute value of this displacement xav" expresses the distance from the cylinder head position Psh to the mover amplitude center position Pav. Further, xini" is the displacement on the third coordinate system X", which indicates the mover neutral position Pini, and the absolute value of this displacement xini" expresses the distance [m] between the mover neutral position (the position of the mover in the state where the support spring is not deformed) Pini and the cylinder head position Psh.

Here, the instantaneous acceleration a [m/s/s] is obtained as shown in the following formula (4), by differentiating the instantaneous velocity v[m/s] given by formula (1).

$$a = \frac{dv}{dt} \qquad \text{Formula (4)}$$

Furthermore, the displacement x'[m] on the second coordinate system X', which indicates the distance from the mover amplitude center position Pav to the mover front end position P, is obtained by setting the constant Const. in formula (2) at 0.

Furthermore, the total mass m[kg] of the movable member, the spring constant k[N/m] of the support spring, and the displacement xini"[m] on the third coordinate system X", which indicates the distance from the cylinder head position Psh to the mover neutral position Pini, are known values, and the driving current I can be a measured value.

Accordingly, the displacement xav" on the third coordinate system X", which indicates the distance from the cylinder head position Psh to the mover amplitude center position Pav, can be calculated using formula (3).

Further, the displacement xtd"[m] on the third coordinate system X", which indicates the top dead point position of the mover (the position where the mover is closest to the cylinder head) Ptd, can be obtained as a displacement in a position which is apart from the displacement xav" on the third coordinate system X" obtained by formula (3) (the distance from the cylinder head position Psh to the mover amplitude center position Pav), by a distance equal to half the already-obtained mover stroke Lps[m] (=Lps/2), toward the cylinder head.

In this way, the mover stroke length Lps[m], and the displacement xtd" on the third coordinate system X", which indicates the mover top dead point position Ptd as a distance from the cylinder head position Psh, are calculated from the current I and the voltage V which are applied to the linear vibration motor.

However, as the motor thrust constant α employed in the arithmetic operation is decided on the basis of characteristics of the magnet that is used in the linear vibration motor, the result of the arithmetic operation may include an error due to dispersion among units, variations with time, changes caused by heat, and the like.

More specifically, when the motor thrust constant α varies by 10%, the calculated mover stroke varies by more than 10%. In such case, in order to avoid the collision between the mover and the cylinder head on the basis of the position of the mover calculated by the arithmetic operation using the above-mentioned formulae, a margin of 10% or more should be given to the clearance between the mover and the cylinder head. Accordingly, the stroke of the mover cannot be enlarged up to a position in which the mover approaches a collision critical position of the mover (i.e., a position where the mover contacts the cylinder head), which has been calculated by the arithmetic operation.

SUMMARY OF THE INVENTION

The present invention has for its object to provide a motor driving apparatus which can calculate the motor thrust constant according to its operation state, thereby detecting the position of the mover with high accuracy.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a motor driving apparatus for driving a linear vibration motor having a mover which is reciprocatably provided and a spring member which supports the mover, including: a motor driver having an operating mode for applying a driving voltage to the linear vibration motor so as to activate an operation of the motor, and a non-operating mode for applying a DC voltage to the linear vibration motor so as to generate a thrust of the mover; a thrust information output unit for outputting thrust information indicating the thrust of the mover, which is generated by the application of the DC voltage to the linear vibration motor; a thrust constant calculation unit for calculating a motor thrust constant of the linear vibration motor by performing an arithmetic operation of dividing the thrust indicated by the thrust information, by a DC current that is supplied to the linear vibration motor due to the application of the DC voltage to the linear vibration motor; and a mover position calculation unit for performing position calculation for obtaining the position of the mover on the basis of the calculated motor thrust constant. Therefore, the arithmetic operation for calculating the position of the mover can be carried out with high precision by using an accurate motor thrust constant.

That is, according to the conventional method in which a fixed motor thrust constant is used at the position calculation for obtaining the mover position, the accuracy of the mover position that is obtained by the position calculation is low due to variations in the thrust constant among different linear vibration motors, while according to the present invention, the motor thrust constant is calculated for each linear vibration motor, whereby the position calculation can be performed without being affected by the variations in the thrust constant among different linear vibration motors. In other words, it is possible to use an accurate value of the motor thrust constant corresponding to each linear vibration motor at the position calculation, thereby increasing the precision in the position calculation.

In addition, according to the present invention, the processing for calculating the motor thrust constant is performed after assembly of the linear vibration motor. Accordingly, the following effect is also achieved with relative to the case where the calculation of the motor thrust constant is performed at the assembly of the linear vibration motor.

That is, in the method of deciding the motor thrust constant that is used at the calculation of the mover position at the assembly of the linear vibration motor, complicated processes for correcting the motor thrust constant are further required at the time of assembly, and also the linear vibration motor for which the motor thrust constant has been decided is combined with a driving apparatus which has been adapted to the decided thrust constant. Consequently, when either the motor or the driving apparatus is broken, both should be changed.

In contrast, according to the present invention, the processing for calculating the motor thrust constant is performed after the assembly of the linear vibration motor. Therefore, the processes for correcting the motor thrust constant at the assembly are not required. In addition, as the motor thrust constant is decided in the state where the driving apparatus is combined with the linear vibration motor, even when either the linear vibration motor or the driving apparatus is broken, the thrust constant can be decided after the broken member is changed, whereby all that is needed is the changing of the broken member.

According to a 2nd aspect of the present invention, the motor driving apparatus of the 1st aspect further includes: a moving distance detection unit for detecting a distance by which the mover has moved as a result of the application of the DC voltage to the linear vibration motor, and the thrust information output unit deciding the mover thrust that is generated by the application of the DC voltage to the linear vibration motor, according to an arithmetic operation of multiplying the moving distance of the mover, detected by the moving distance detection unit, by a spring constant of the spring member, and outputting thrust information which indicates the decided mover thrust. Therefore, it is possible to calculate the motor thrust constant only by detecting the moving distance of the mover, whereby the calculation of the motor thrust constant can be achieved by a simple structure.

Further, the calculation of the mover position is performed in the state where the mover is approximately standing still, whereby it is possible to utilize a simple position sensor that has not so high frequency characteristics.

According to a 3rd aspect of the present invention, the motor driving apparatus of the 1st aspect further includes: a mover position detection unit that, when the mover has arrived at a prescribed position that is a predetermined distance away from a neutral position in which a spring force of the spring member does not act on the mover, outputs a detection signal indicating that the mover has arrived at the prescribed position, in which, when receiving the detection signal, the thrust information output unit outputs the thrust information indicating the mover thrust that is balanced with the spring force of the spring member, which is generated by the application of the DC voltage to the linear vibration motor and acts on the mover that is located at the prescribed position. Therefore, it is possible to calculate the motor thrust constant only by detecting that the mover has arrived at a predetermined position as a result of the application of the DC voltage to the linear vibration motor, whereby the calculation of the thrust constant can be achieved by a simple structure.

Further, according to the present invention, the state of the mover to be detected is whether the mover is located at a predetermined position or not, in other words, whether the status value of the mover is 0 or 1. Therefore, it is possible to realize the predetermined position arrival detection unit by a simple sensor.

According to a 4th aspect of the present invention, in the motor driving apparatus of any of the 1st to 3rd aspects, the motor driver temporarily changes its mode to the non-operating mode at a start of the operation of the linear vibration motor so as to calculate the motor thrust constant, and the mover position calculation unit performs the position calculation for obtaining the mover position during the operation of the linear vibration motor, using the motor thrust constant calculated in the non-operating mode at the start of the operation of the linear vibration motor. Therefore, it is possible to use an accurate motor thrust constant corresponding to each linear vibration motor at the calculation of the mover position, thereby increasing the precision in the calculation of the mover position.

Further, according to this invention, the processing of calculating the motor thrust constant is performed before the operation of the linear vibration motor. Therefore, the arithmetic operation for calculating the mover position is performed always using a motor thrust constant in the latest state of the linear vibration motor. Accordingly, even when the motor thrust constant varies with time, position calculation with high precision can be achieved.

According to a 5th aspect of the present invention, in the motor driving apparatus of any of the 1st to 3rd aspects, the motor driver temporarily changes its mode to the non-operating mode at an end of the operation of the linear vibration motor so as to calculate the motor thrust constant, and the mover position calculation unit performs the position calculation for obtaining the mover position during the operation of the linear vibration motor, using the motor thrust constant calculated in the non-operating mode at the end of the previous operation. Therefore, the processing for calculating the motor thrust constant is performed immediately after the end of the operation of the linear vibration motor. That is, the position calculation for obtaining the mover position is performed always using the motor thrust constant in the latest state of the linear vibration motor. Accordingly, even when the motor thrust constant varies with time, it is possible to achieve high precision position calculation.

In addition, according to the present invention, the calculation of the motor thrust constant is performed immediately after the end of the operation of the linear vibration motor. Therefore, the motor thrust constant is calculated in the state where the motor temperature is approximately equal to the actual temperature at the time when the linear vibration motor has been operating. That is, while the motor thrust constant varies with time, it is possible to obtain an accurate motor thrust constant at the operation of the linear vibration motor, by calculating the thrust constant at the temperature when the motor is actually operating. Accordingly, the position calculation for obtaining the mover position can be achieved with high precision.

Further, according to this invention, the calculation of the motor thrust constant is performed after the halt of the operation of the linear vibration motor. Therefore, it is possible to calculate the motor thrust constant without hindering the operation of the linear vibration motor.

According to a 6th aspect of the present invention, the motor driving apparatus of any of the 1st to 3rd aspects further includes: a temperature detection unit for detecting a temperature of the linear vibration motor; and a motor thrust constant estimation unit for estimating a motor thrust constant that is used at the position calculation for obtaining the mover position during the operation of the linear vibration motor, on the basis of the motor thrust constant calculated by the thrust constant calculation unit and the temperature detected by the temperature detection unit, in which the motor driver temporarily changes its mode to the non-operating mode at a start or end of the operation of the linear vibration motor, or at the start and end of the operation, so as to calculate the motor thrust constant, and the motor thrust constant estimation unit, when the linear vibration motor is not operating, derives a relationship between the temperature of the linear vibration motor and the motor thrust constant on the basis of the motor thrust constant calculated in the non-operating mode and the temperature at that calculation of the motor thrust constant, detected by the temperature detection unit, and, when the linear vibration motor is operating, estimates the motor thrust constant in the operating state of the linear vibration motor, from the derived relationship between the temperature of the linear vibration motor and the motor thrust constant on the basis of the temperature detected by the temperature detection unit, and the mover position calculation unit performs the position calculation for obtaining the mover position during the operation of the linear vibration motor, using the estimated motor thrust constant. Therefore, it is possible to use an accurate motor thrust constant at the calculation of the mover position in the state where the linear vibration motor is operating, thereby increasing the precision in the calculation of the mover position.

Further, according to the present invention, the motor thrust constant of the linear vibration motor in the operating state is estimated from the motor temperature at a time when the linear vibration motor is actually operating. Therefore, even when variations in the temperature of the linear vibration motor are great, the calculation of the mover position can be achieved with high precision by using an accurate thrust constant.

According to a 7th aspect of the present invention, there is provided an air conditioner equipped with a compressor which has a cylinder and a piston, and compresses a liquid in the cylinder by a reciprocating motion of the piston, and the air conditioner includes a linear vibration motor for making the piston reciprocate, having a mover which is reciprocatably provided and a spring member which supports the mover; and a motor driving unit for driving the linear vibration motor, which motor driving unit is a motor driving apparatus as defined in any of the 1st to 6th aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, resulting in a contribution to conservation of global environment. Further, the motor driving apparatus calculates the motor thrust constant in the non-operating mode of the linear vibration motor and then calculates the position of the mover of the linear vibration motor using the calculated motor thrust constant in the operating mode of the linear vibration motor. Therefore, it is possible to detect the position of the piston with high accuracy during the operation of the linear compressor. Accordingly, the clearance between the piston and the cylinder head can be reduced, resulting in miniaturization of the linear compressor, which leads to miniaturization of the air conditioner.

According to an 8th aspect of the present invention, there is provided a refrigerator equipped with a compressor which has a cylinder and a piston, and compresses a liquid in the cylinder by a reciprocating motion of the piston, and the refrigerator includes a linear vibration motor for making the piston reciprocate, having a mover which is reciprocatably provided and a spring member which supports the mover; and a motor driving unit for driving the linear vibration motor, which motor driving unit is a motor driving apparatus as defined in any of the 1st to 6th aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, resulting in a contribution to conservation of global environment. Further, the motor driving apparatus calculates the motor thrust constant in the non-operating mode of the linear vibration motor and then calculates the position of the mover of the linear vibration motor using the calculated motor thrust constant in the operating mode of the linear vibration motor. Therefore, it is possible to detect the position of the piston with high accuracy during the operation of the linear compressor. Accordingly, the clearance between the piston and the cylinder head can be reduced, resulting in miniaturization of the linear compressor, which leads to miniaturization of the refrigerator.

According to a 9th aspect of the present invention, there is provided a cryogenic freezer equipped with a compressor which has a cylinder and a piston, and compresses a liquid in the cylinder by a reciprocating motion of the piston, and the cryogenic freezer includes a linear vibration motor for making the piston reciprocate, having a mover which is reciprocatably provided and a spring member which supports the mover; and a motor driving unit for driving the linear vibration motor, which motor driving unit is a motor driving apparatus as defined in any of the 1st to 6th aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, resulting in a contribution to conservation of global environment. Further, the motor driving apparatus calculates the motor thrust constant in the non-operating mode of the linear vibration motor and then calculates the position of the mover of the linear vibration motor using the calculated motor thrust constant in the operating mode of the linear vibration motor. Therefore, it is possible to detect the position of the piston with high accuracy during the operation of the linear compressor. Accordingly, the clearance between the piston and the cylinder head can be reduced, resulting in miniaturization of the linear compressor, which leads to miniaturization of the cryogenic freezer.

According to a 10th aspect of the present invention, there is provided a hot-water supply unit equipped with a compressor which has a cylinder and a piston, and compresses a liquid in the cylinder by a reciprocating motion of the piston, and the hot-water supply unit includes a linear vibration motor for making the piston reciprocate, having a mover which is reciprocatably provided and a spring member which supports the mover; and a motor driving unit for driving the linear vibration motor, which motor driving unit is a motor driving apparatus as defined in any of the 1st to 6th aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, resulting in a contribution to conservation of global environment. Further, the motor driving apparatus calculates the motor thrust constant in the non-operating mode of the linear vibration motor and then calculates the position of the mover of the linear vibration motor using the calculated motor thrust constant in the operating mode of the linear vibration motor. Therefore, it is possible to detect the position of the piston with high accuracy during the operation of the linear compressor. Accordingly, the clearance between the piston and the cylinder head can be reduced, resulting in miniaturization of the linear compressor, which leads to miniaturization of the hot-water supply unit.

According to an 11th aspect of the present invention, there is provided a handy phone equipped with a linear vibration motor for generating vibration, and a motor driving unit for driving the linear vibration motor, wherein the linear vibration motor having a mover which is reciprocatably provided, and a spring member which supports the mover; and the motor driving unit is a motor driving apparatus as defined in any of the 1st to 6th aspects. Therefore, vibration can be informed to the outside with the two decrees of freedom, i.e., the number of vibrations and the amplitude (vibration), whereby variations of vibration patterns can be increased as compared with the case where vibration is generated using the conventional rotation-type motor. Further, the motor driving apparatus calculates the motor thrust constant in the non-operating mode of the linear vibration motor and then calculates the position of the mover using the calculated motor thrust constant in the operating mode of the linear vibration motor. Therefore, it is possible to detect the position of the mover with high accuracy during the operation of the linear vibration motor. Accordingly, the clearance between the mover and its peripheral member can be reduced, resulting in miniaturization of the linear vibration motor, which leads to miniaturization of the handy phone.

DETAILED DESCRIPTION OF THE PREFERRED EMBODIMENTS

Hereinafter, embodiments of the present invention will be described.

[Embodiment 1]

Figure 1:
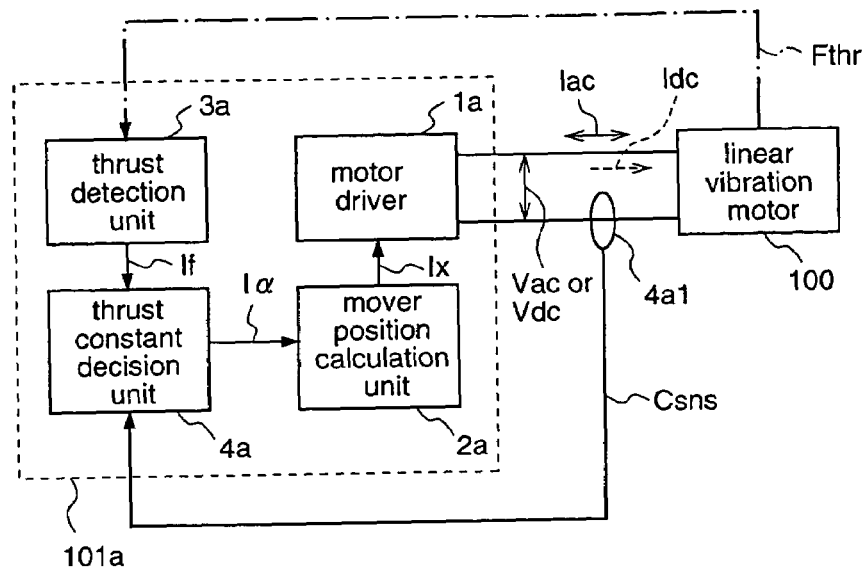
FIG. 1 is a block diagram for explaining a motor driving apparatus 101a according to a first embodiment of the present invention.

FIG. 1 is a block diagram for explaining a motor driving apparatus 101a according to a first embodiment of the present invention.

The motor driving apparatus 101a according to the first embodiment drives a linear vibration motor 100 having a stator, a mover, and a spring member which supports the mover so as to form a spring vibration system including the mover, at a driving frequency corresponding to a required motor output. This motor driving apparatus 101a performs position calculation for obtaining the position of the mover on the basis of a driving current and a driving voltage, using a motor thrust constant of the linear vibration motor 100, and controls the driving of the linear vibration motor according to the obtained position of the mover. Here, the driving frequency of the linear vibration motor is a vibration frequency of the spring vibration system. Further, the stator comprises an electromagnet that is obtained by winding a coil around an iron core, and the mover comprises a permanent magnet.

More specifically, the motor driving apparatus 101a includes a motor driver 1a for driving/controlling the linear vibration motor 100 on the basis of position information Ix which indicates the position Xcu1 of the mover. The motor driver 1a has two modes, i.e., an operating mode in which the driving voltage is applied to the linear vibration motor 100 so as to activate the linear vibration motor 100, and a non-operating mode in which a DC voltage Vdc is applied to the linear vibration motor 100 so as to generate a thrust of the mover.

The motor driving apparatus 101a further includes a thrust information output unit 3a (hereinafter, referred to as a thrust detection unit 3a) for detecting a thrust Fthr of the mover that is generated by the DC voltage Vdc applied from the motor driver 1a to the linear vibration motor 100, and outputting thrust information If which indicates the detected thrust Fthr. Here, the thrust Fthr of the mover corresponds to an electromagnetic force that acts on the mover due to application of the DC voltage Vdc to the linear vibration motor 100.

The motor driving apparatus 101a further includes a thrust information calculation unit 4a (hereinafter, referred to as a thrust constant decision unit 4a) that has a current sensor 4a1 for detecting a current supplied to the linear vibration motor 100, and decides the motor thrust constant α of the linear vibration motor 100 by an arithmetic operation of dividing the thrust Fthr of the mover generated by the application of the DC voltage Vdc to the linear vibration motor 100, by the DC current Idc that is supplied to the linear vibration motor due to the application of the DC voltage Vdc to the linear vibration motor 100, on the basis of the thrust information If and an output Csns from the current sensor, and outputs thrust constant information Iα which indicates the decided thrust constant α.

The motor driving apparatus 101a further includes a mover position calculation unit 2a for performing position calculation of calculating the position of the mover from the driving current and the driving voltage of the linear vibration motor, using the thrust constant α indicated by the thrust constant information Iα.

Hereinafter, the motor driver 1a, the mover position calculation unit 2a, the thrust detection unit 3a, and the thrust constant decision unit 4a, which are constituents of the motor driving apparatus 101a, will be described in more detail.

When the operation mode is the operating mode, the motor driver 1a receives a supply voltage (not shown), and applies a driving voltage to the linear vibration motor 100 to drive the linear vibration motor 100. Normally, an AC voltage Vac is applied to the linear vibration motor 100 as the driving voltage, and an AC current Iac is supplied to the linear vibration motor 100 as the driving current. When the AC voltage Vac is applied as the driving voltage to the linear vibration motor 100, the mover reciprocates at a frequency that is the same as the frequency of the AC voltage Vac. When the DC voltage Vdc is applied to the linear vibration motor 100, the mover is subjected to some electromagnetic force, whereby a thrust Fthr of the mover is generated. In addition, the motor driver 1a decides the level (peak value) of the driving voltage (AC voltage) Vac on the basis of a position signal Ix which indicates the position Xcul of the mover. Further, the motor driver 1a has a control unit (not shown) for switching between a thrust constant calculation mode (non-operating mode) in which the DC voltage Vdc is applied to the linear vibration motor so as to perform an arithmetic operation for calculating the thrust constant α, and the operating mode in which the AC voltage Vac is applied to the linear vibration motor 100 so as to perform the normal operation of the linear vibration motor 100.

The mover position calculation unit 2a obtains the position of the mover by an arithmetic operation during the operation of the linear vibration motor 100, i.e., in the state where the mover is reciprocating.

As a specific method, there is employed the method for calculating the position of the mover according to the motion equation for the linear vibration motor 100, as disclosed in Japanese Unexamined Patent Publication No. Hei. 8-508558 that has been described above as the prior art. In this case, the motor thrust constant α that is used in the calculation of the mover position is decided by the thrust constant decision unit 4a.

The thrust detection unit 3a detects the thrust Fthr of the mover generated by the application of the DC voltage Vdc to the linear vibration motor 100. To be more specific, the detection of the mover thrust can be performed by a sensor for detecting a force, such as a pressure sensor or a strain gauge, which is attached to the mover or a part that is contacted by the mover.

The thrust constant decision unit 4a decides the motor thrust constant α of the linear vibration motor 100 by performing an arithmetic operation of dividing the thrust Fthr indicated by the thrust information If that is outputted from the thrust detection unit 3a, by the value Idc(1) of the DC current Idc supplied from the motor driver 1a to the linear vibration motor 100, and outputs thrust constant information Iα which indicates the decided motor thrust constant α.

Here, the value Idc(1) of the DC current Idc that is used in the arithmetic operation for calculating the motor thrust constant α is a current value at a time the thrust detection unit 3a has detected the motor thrust (electromagnetic force exerted on the mover) Fthr. That is, in a case where a pressure sensor that is attached to the housing or the like is employed as the thrust detection unit 3a, even when the DC current Idc is supplied to the linear vibration motor 100 and consequently the mover starts moving, the output from the pressure sensor (i.e., detected value of the electromagnetic force that is exerted on the mover) remains zero until the mover has arrived at the pressure sensor attached to the housing. Therefore, the arithmetic operation for calculating the motor thrust should be performed with reference to a current value Icont (=Idc(1)) at a time the output from the pressure sensor indicates that the electromagnetic force F exerted on the mover has a value other than zero, in other words, when the mover contacts the pressure sensor that is attached to the housing.

In addition, as the method for detecting the DC current Idc, there are considered, for example, a method that utilizes a contactless type current sensor, a method that utilizes Shunt resistance, and a method by which the DC current is calculated from the output voltage of the motor driver 1a and the coil resistance value of the linear vibration motor 100.

Next, the operation of the motor driving apparatus will be described.

Figure 2:
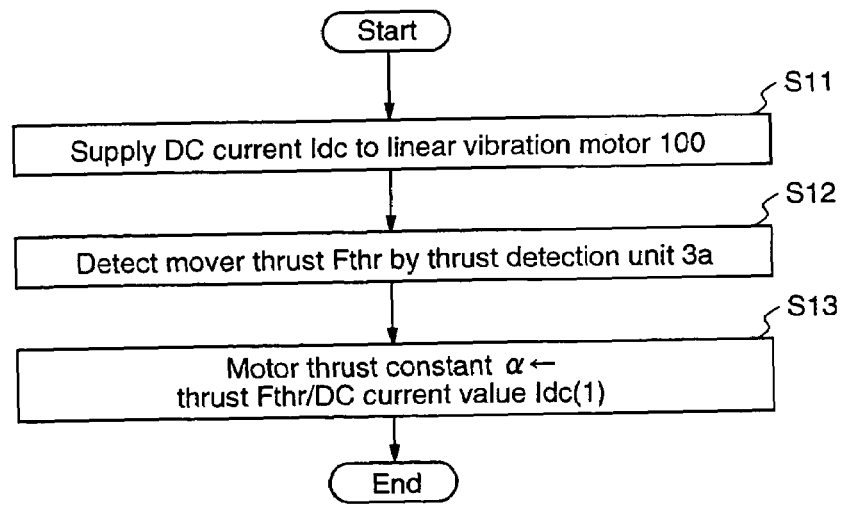
FIG. 2 is a flowchart for explaining an operation of the motor driving apparatus 101a according to the first embodiment.

FIG. 2 is a flowchart for explaining the operation of the motor driving apparatus 101a according to the first embodiment. This figure shows an operation of the motor driving apparatus for calculating the thrust constant.

Initially, the operation of the motor driver 1a in the thrust constant calculation mode (non-operating mode) is described.

The motor driver 1a applies the DC voltage Vdc to the linear vibration motor 100 under the control of the control unit so that the DC current Idc is supplied to the linear vibration motor 100 (step S11).

The thrust detection unit 3a detects the electromagnetic force (mover thrust) Fthr that is exerted on the mover of the linear vibration motor in the state where the value Idc(1) of the DC current Idc that is supplied to the linear vibration motor 100 due to the application of the DC voltage Vdc is maintained (step S12).

The thrust constant decision unit 4a performs an arithmetic operation of dividing the mover thrust Fthr detected in step S12, by the value Idc(1) of the DC current Idc passing through the linear vibration motor 100, thereby obtaining a motor thrust constant α, to obtain thrust constant information Iα which indicates the motor thrust constant α (step S13).

Next, the operation of the motor driver 1a in the operating mode will be described.

The motor driver 1a applies an AC voltage (driving voltage) Vac to the linear vibration motor 100 so that an AC current (driving current) Iac is supplied to the linear vibration motor 100. Thereby, the normal operation of the linear vibration motor 100 is started.

At this time, the mover position calculation unit 2a performs position calculation for obtaining the position of the mover on the basis of the AC current (driving current) Iac and the AC voltage (driving voltage) Vac which are applied to the motor driver 1a, using the motor thrust constant α obtained from steps S11 to S13, and outputs mover position information Ix which indicates the calculated mover position Xcul to the motor driver 1a.

Then, the motor driver 1a controls the AC voltage Vac applied to the linear vibration motor 100 on the basis of the mover position information Ix so that the mover that is reciprocating does not exceed its critical position.

As described above, the motor driving apparatus 101a according to the first embodiment for driving the linear vibration motor 100 includes the motor driver 1a that applies the DC voltage Vdc to the linear vibration motor 100, and the thrust detection unit 3a that detects the thrust of the mover which is generated by the application of the DC voltage Vdc to the linear vibration motor 100. Accordingly, the motor driving apparatus 101a calculates the thrust constant α of the linear vibration motor 100 on the basis of the DC current Idc that is supplied to the linear vibration motor 100 due to application of the DC voltage Vdc to the linear vibration motor and the thrust Fthr of the mover detected by the thrust detection unit 3a. Therefore, a highly accurate mover position can be obtained by the position calculation using the motor thrust constant.

That is, according to the conventional method that utilizes a fixed motor thrust constant at the position calculation for obtaining the position of the mover, the mover position that is obtained by the above-mentioned position calculation has a low accuracy because of the dispersion in the thrust constants of respective linear vibration motors, while according to this first embodiment, the motor thrust constant is calculated adaptively to each linear vibration motor. Therefore, the position calculation can be performed without being affected by the dispersion in the thrust constants of the respective linear vibration motors. That is, the motor thrust constant used in the position calculation can be set at a proper value corresponding to the respective linear vibration motor, thereby increasing the accuracy of the position calculation.

Accordingly, it is possible to control the position of the mover with accuracy while the linear vibration motor is operating. Therefore, the clearance between the mover and the housing of the linear vibration motor can be reduced, thereby realizing miniaturization of the linear vibration motor or power enhancement.

Further, in this first embodiment, the calculation of the motor thrust constant (steps S11 to S13) is performed after assembly of the linear vibration motor to which the motor driving apparatus is connected. Therefore, as compared with the case where the calculation of the motor thrust constant is performed during assembly of the linear vibration motor to which the motor driving apparatus is not connected, the following effect is achieved.

That is, in the case of calculating the motor thrust constant during assembly of the linear vibration motor, the calculated value of the motor thrust constant of each linear vibration motor needs to be held in the motor driving apparatus that is to be combined with each linear vibration motor.

For example, in a motor driving apparatus that performs an arithmetic operation for obtaining the mover position by hardware, the default of the motor thrust constant is set at the calculated value of the motor thrust constant of the linear vibration motor that is to be combined with the motor driving apparatus, by controlling the volume of an active element such as a resistance. In addition, in a motor driving apparatus that performs the arithmetic operation for obtaining the mover position by software, the default of the motor thrust constant which is stored in a microcomputer is changed to the value of the motor thrust constant calculated at the assembly, or the default of the motor thrust constant is set at the calculated value of the motor thrust constant by controlling the volume of the active element such as a resistance.

Therefore, in the case of calculating the motor thrust constant at the assembly of the linear vibration motor, the complicated processing for correcting the default of the motor thrust constant of the respective motor driving apparatus at the assembly are required. In addition, when the motor driving apparatus is combined with the linear vibration motor, the default of the motor thrust constant of the motor driving apparatus is set at the calculated value of the motor thrust constant of the linear vibration motor with which the driving apparatus is combined. Therefore, even when one of the motor and the driving apparatus is broken, both of these should be changed.

On the other hand, in the case of calculating the motor thrust constant after the assembly of the linear vibration motor as in this first embodiment, the complicated processing for correcting the default of the motor thrust constant of the motor driving apparatus are not required at the assembly. Further, the value of the motor thrust constant that is held in the motor driving apparatus is set in the state where the driving apparatus is combined with the linear vibration motor. Therefore, even when either the linear vibration motor or the driving apparatus is broken, it is possible to set the motor thrust constant of the motor driving apparatus after the broken member is changed. In other words, when one of the motor and the driving apparatus is broken, all that required is only changing of the broken member.

In this first embodiment, the processing of steps S11 to S13 is performed before starting the normal operation of the linear vibration motor, while the processing of steps S11 to S13 may be performed after ending the normal operation of the linear vibration motor. This processing can be performed in any state so long as the linear vibration motor is not operating. To be more specific, the processing of steps S11 to S13 is performed to calculate the motor thrust constant in the state where the mover is not reciprocating, and the calculated value is stored in the microcomputer or the like, thereby holding the calculated motor thrust constant.

[Embodiment 2]

Figure 3:
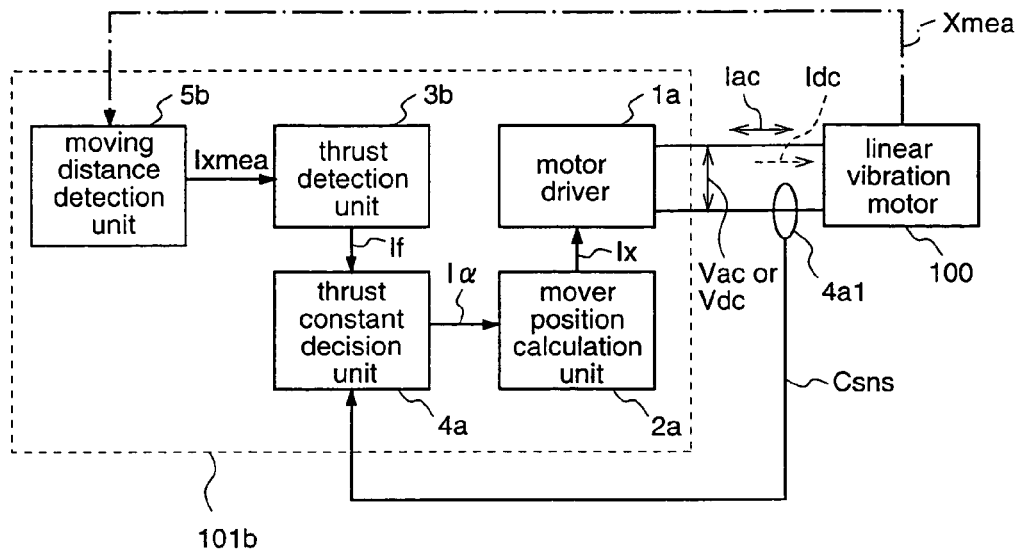
FIG. 3 is a block diagram for explaining a motor driving apparatus 101b according to a second embodiment of the present invention.

FIG. 3 is a block diagram illustrating a motor driving apparatus 101b according to a second embodiment of the present invention.

The motor driving apparatus 101b according to the second embodiment is different from the motor driving apparatus 101a only in that the apparatus 101b calculates the motor thrust constant a on the basis of a distance Xmea by which the mover has moved due to application of an DC voltage Vdc to the linear vibration motor and the spring constant of the spring member that supports the mover, and performs the position calculation for obtaining the position of the mover on the basis of the calculated motor thrust constant.

More specifically, the motor driving apparatus 101b according to the second embodiment includes, in place of the thrust detection unit 3a in the motor driving apparatus 101a according to the first embodiment, a moving distance detection unit 5b for detecting a moving distance Xmea by which the mover has moved due to application of the DC voltage Vdc to the linear vibration motor 100, and a thrust detection unit 3b for detecting a thrust Fthr of the mover which is generated by the application of the DC voltage Vdc to the linear vibration motor on the basis of the detected moving distance Xmea and the spring constant k of the spring member that supports the mover.

Hereinafter, the motor driver 1a, the mover position calculation unit 2a, the thrust constant decision unit 4a, and the moving distance detection unit 5b, and the thrust detection unit 3b, which are constituents of the motor driving apparatus 101b, will be described in more detail.

The motor driver 1a, the mover position calculation unit 2a, and the thrust constant decision unit 4a of the motor driving apparatus 101b according to the second embodiment are equivalent to those in the motor driving apparatus 101a according to the first embodiment.

In the thrust constant calculation mode (non-operating mode), the motor driver 1a applies a DC voltage Vdc of a prescribed level to the linear vibration motor 100 so that a DC current Idc is supplied to the linear vibration motor 100, while in the operating mode, the motor driver 1a applies an AC voltage Vac to the linear vibration motor 100 and controls the level (peak value) of the AC voltage Vac according to the mover position calculated by the mover position calculation unit 2a.

Further, the moving distance detection unit 5b detects the moving distance Xmea by which the mover has moved due to the application of the DC voltage Vdc to the linear vibration motor in an approximately static state. This unit can be constituted by a differential transformer having not so high frequency characteristics, or the like.

For example, as a method for measuring the displacement of the mover using a differential transformer, there is considered a method by which a magnetic substance is attached to a part of the mover, and the differential transformer is mounted on the housing of the linear vibration motor, thereby measuring the position where the magnetic substance is the closest to the differential transformer by using the differential transformer, as the displacement of the mover.

Further, as a concrete method for measuring the displacement of the mover, in addition to the above-mentioned method that utilizes the differential transformer, there is also considered a method by which an area that acts as a landmark, such as a concave or convex portion or a tapered portion, is formed in a part of the mover, and this area is detected by a gap sensor, thereby measuring the displacement of the mover.

The thrust detection unit 3b obtains the thrust Fthr of the mover that is generated by the DC current Idc that is supplied to the linear vibration motor 100, using an arithmetic operation of multiplying the moving distance Xmea of the mover that is detected by the moving distance detection unit 5b by the spring constant k of the spring member which is a constituent of the linear vibration motor 100.

Next, the operation of the motor driving apparatus will be described.

Figure 4:
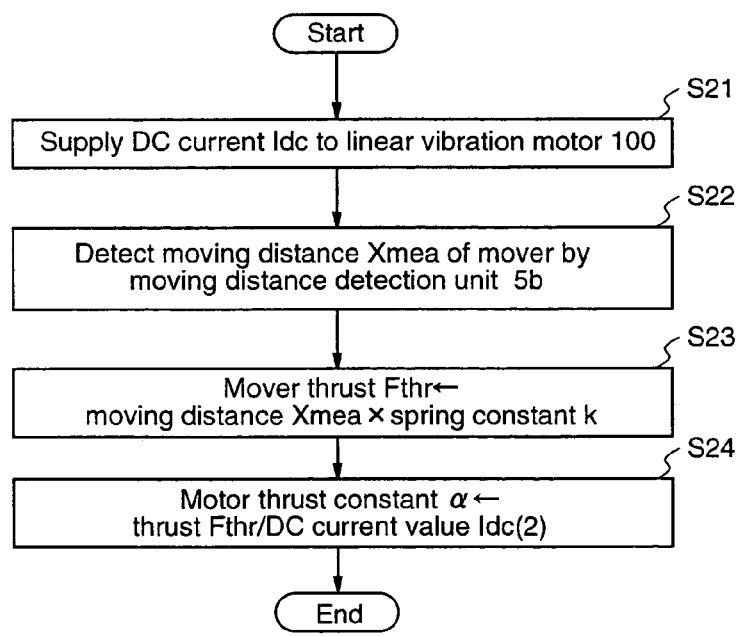
FIG. 4 is a flowchart for explaining an operation of the motor driving apparatus 101b according to the second embodiment.

FIG. 4 is a flowchart for explaining an operation of the motor driving apparatus 101b. This figure shows an operation of the motor driving apparatus for calculating the thrust constant.

Initially, a description will be given of the operation of the motor driver 1a in the thrust constant calculation mode.

The motor driver 1a applies a DC voltage Vdc of a prescribed level to the linear vibration motor 100 under the control of the controller so that a DC current Idc is supplied to the linear vibration motor 100 (step S21).

The moving distance detection unit 5b detects a distance Xmea by which the mover has moved from its neutral position where the spring force of the spring member does not act on the mover in a state where the value Idc(2) of the DC current Idc supplied to the linear vibration motor 100 due to the application of the DC voltage Vdc is kept constant, and outputs moving distance information Ixmea which indicates the detected moving distance Xmea (step S22).

The thrust detection unit 3b calculates the thrust Fthr of the mover which is generated by the application of the DC voltage Vdc to the linear vibration motor 100, by multiplying the moving distance Xmea of the mover indicated by the moving distance information Ixmea that is obtained from the moving distance detection unit 5b, by the spring constant k of the spring member which is a constituent of the linear vibration motor 100, and outputs thrust information If that indicates the calculated thrust Fthr (step S23).

Then, the thrust constant decision unit 4a calculates the motor thrust constant α by dividing the mover thrust Fthr detected in step S23, by the value Idc(2) of the DC current Idc that is supplied to the linear vibration motor 100, and outputs thrust constant information Iα which indicates the calculated thrust constant α (step S24).

The operation of the mover driver 1a in the operating mode is performed in the same manner as in the first embodiment.

When the motor driver 1a applies the AC voltage Vac as a driving voltage to the linear vibration motor 100, the normal operation of the linear vibration motor 100 is started.

While the linear vibration motor 100 is operating, the position calculation for obtaining the position of the mover by the mover position calculation unit 2a is performed using the motor thrust constant α that is obtained from steps S21 to S24. Then, the motor driver 1a controls the AC voltage Vac that is applied to the linear vibration motor 100 according to the mover position obtained by the position calculation.

As described above, the motor driving apparatus 101b for driving the linear vibration motor 100 according to the second embodiment includes the motor driver 1a that applies the DC voltage Vdc to the linear vibration motor 100, the moving distance detection unit 5b that detects the moving distance Xmea by which the mover has moved from the neutral position as a result of the application of the DC voltage Vdc to the linear vibration motor 100, and the thrust detection unit 3b that obtains the mover thrust Fthr that is generated by the application of the DC voltage Vdc to the linear vibration motor 100 on the basis of the detected moving distance Xmea and the spring constant k of the spring member. Accordingly, the motor driving apparatus 101b calculates the thrust constant α of the linear vibration motor 100 on the basis of the DC current Idc that is supplied to the linear vibration motor 100 by the application of the DC voltage Vdc to the linear vibration motor, and the thrust Fthr of the mover obtained by the thrust detection unit 3b. Therefore, it is possible to perform the calculation of the motor thrust constant α only by detecting the moving distance Xmea of the mover, whereby the calculation of the thrust constant α can be achieved by a simple structure.

In addition, as the detection of the mover position is performed in the state where the mover is approximately standing still, it is possible to utilize a simple position sensor that does not have such high frequency characteristics.

[Embodiment 3]

Figure 5:
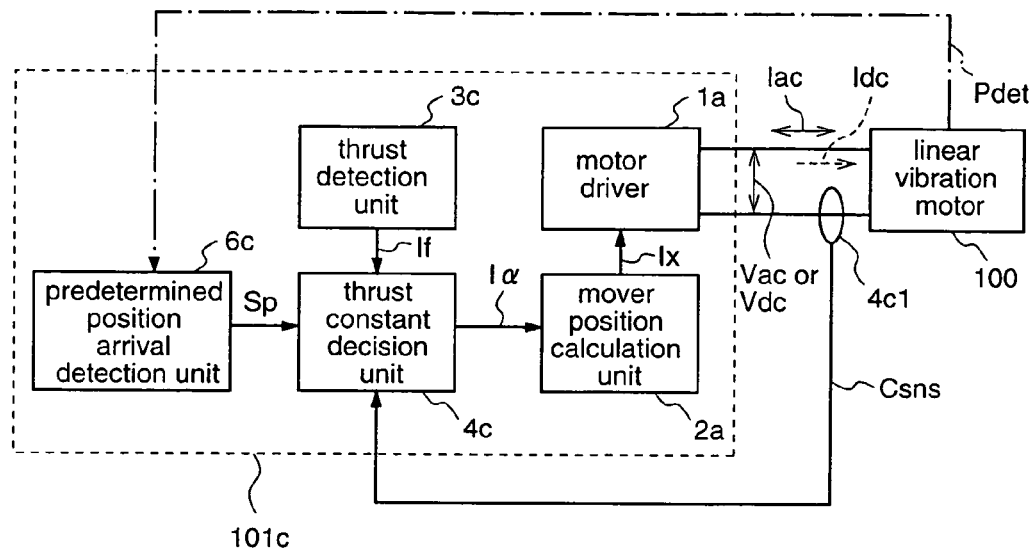
FIG. 5 is a block diagram for explaining a motor driving apparatus 101c according to a third embodiment of the present invention.

FIG. 5 is a block diagram for explaining a motor driving apparatus 101c according to a third embodiment of the present invention.

The motor driving apparatus 101c according to the third embodiment is different from the motor driving apparatus 101a according to the first embodiment only in that the apparatus 101c calculates the motor thrust constant α on the basis of a value Idc(3) of the DC current Idc when the mover has arrived at a predetermined position as a result of application of the DC voltage Vdc to the linear vibration motor 100, and a drag that is required to keep the mover at the predetermined position against the spring force of the spring member, and performs position calculation for obtaining the mover position on the basis of the calculated motor thrust constant α.

That is, the motor driving apparatus 101c according to the third embodiment includes, as the motor driving apparatus 101a according to the first embodiment, a mover position calculation unit 2a for calculating the position of the mover while the linear vibration motor 100 is operating, and the motor driver 1a for driving/controlling the linear vibration motor 100 according to the calculated mover position.

This motor driving apparatus 101c further includes a mover position detection unit (hereinafter, referred to as a predetermined position arrival detection unit) 6c for detecting that the mover has arrived at a predetermined position Pdet as a result of the application of the DC voltage Vdc to the linear vibration motor 100, and outputting a detection signal Sp, and a thrust detection unit 3c for outputting information (thrust information) If indicating a drag that is required to hold the mover against the spring force of the spring member so that the mover is located at the predetermined position which is different from the neutral position. Here, the neutral position is a position where the spring force of the spring member that supports the mover does not act on the mover.

The motor driving apparatus 101c further includes a thrust constant decision unit 4c having a current sensor 4c1 that detects the current that is supplied to the linear vibration motor 100, for deciding the thrust constant α of the linear vibration motor on the basis of the thrust information If from the thrust detection unit 3c, the detection signal Sp from the predetermined position arrival detection unit 6c, and an output Csns from the current sensor 4c1, and outputting thrust constant information Iα indicating the decided thrust constant α to the mover position calculation unit 2a.

Hereinafter, the motor driver 1a, the mover position calculation unit 2a, the thrust detection unit 3c, the thrust constant decision unit 4c, and the predetermined position arrival detection unit 6c, which are constituents of the motor driving apparatus 101c, will be described in more detail.

The motor driver 1a and the mover position calculation unit 2a in the motor driving apparatus 101c according to the third embodiment are equivalent to those in the motor driving apparatus 101a according to the first embodiment.

When the mover has moved from its neutral position to a predetermined position Pdet as a result of the application of the DC voltage Vdc to the linear vibration motor 100, the predetermined position arrival detection unit 6c according to the third embodiment detects that the mover has arrived at the predetermined position Pdet. The detection signal Sp as an output signal from the predetermined position arrival detection unit 6c is a binary signal indicating that the mover has arrived at the predetermined position or that the mover does not arrive at the predetermined position, using a binary value (i.e., signal value [1] or [0]).

For example, a Hall element that outputs a binary signal having a value of [1] or [0] is utilized as the predetermined position arrival detection unit 6c. Further, the predetermined position arrival detection unit 6c is not restricted to the Hall element. The predetermined position arrival detection unit 6c can be designed so as to generate some vibrations when the mover has arrived at the predetermined position. In this case, the thrust information decision unit 4c detects these vibrations.

Further, in the case of equipment in which the mover reciprocates within a cylinder, the arrival of the mover to a predetermined position can be detected by detecting vibration generated by a contact between the cylinder head and the mover. The contact between the mover and other member may be detected by a method in which a deformable member, for example a needle-shaped metallic member having an elasticity, is fixed to a part of the linear vibration motor, which does not move even when the mover is displaced, and vibration resulting from the contact between the metallic member and the mover or a part such as a spring member that is displaced according to the motion of the mover is detected. When such deformable member is utilized, the part of the linear vibration motor to which this deformable member is fixed is not restricted to a position where the mover constantly reaches during the operation, but may be a position where the mover never reaches during the normal operation. By fixing the deformable member to such position, the mover would contact the deformable member only when the thrust constant is detected during the non-operating mode. Therefore, the deterioration of the deformable member due to the contact can be minimized, thereby increasing the reliability. In this case, a common vibration sensor can be utilized as a sensor for detecting the vibration resulting from the contact between the mover and the deformable member.

Here, the above-mentioned method for detecting that the mover has arrived at the predetermined position detects the vibration resulting from the contact between the mover and the deformable member. However, this method may detect an electric signal that is generated due to a contact between the mover and other member. As a specific structure, there is conceived a switch that closes a contact point when the mover and other member contact.

Further, the thrust detection unit 3c outputs thrust information If which indicates, as the thrust Fthr of the mover, a previously calculated drag that is required to hold the mover at the predetermined position other than the neutral position against the spring force of the spring member which supports the mover. To be more specific, the thrust indicated by the thrust information If from the thrust detection unit $3c$ is the product of the distance from the neutral position (i.e., the position of the mover when no force is applied to the linear vibration motor) to the predetermined position Pdet, and the spring constant k of the support spring which is a constituent of the linear vibration motor $100$.

The thrust constant decision unit $4c$ detects a value Idc(3) of the DC current Idc that is supplied to the linear vibration motor $100$ when the detection signal Sp indicating that the mover has arrived at the predetermined position is inputted from the predetermined position arrival detection unit $6c$, then performs an arithmetic operation of dividing the mover thrust Fthr indicated by the thrust information If that is outputted from the thrust detection unit $3c$, by the detected current value Idc(3) thereby to decide the motor thrust constant $\alpha$, and outputs thrust constant information I$\alpha$ which indicates the motor thrust constant $\alpha$.

Next, the operation of the motor driving apparatus will be described.

Figure 6:
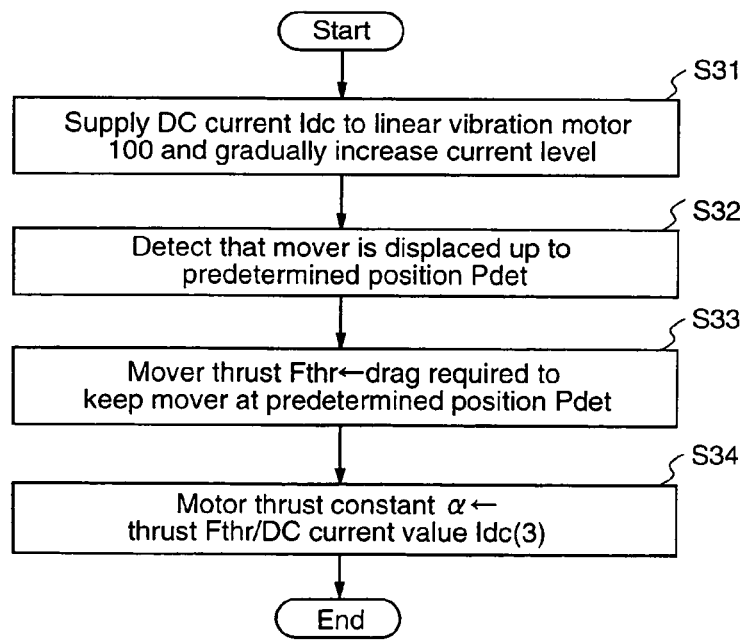
FIG. 6 is a flowchart for explaining an operation of the motor driving apparatus 101c according to the third embodiment of the present invention.

FIG. 6 is a flowchart for explaining the operation of the motor driving apparatus $101c$ according to the third embodiment. This figure shows an operation of the motor driving apparatus for calculating the thrust constant.

Initially, a description will be given of the operation of the motor driver $1a$ in the thrust constant calculation mode (non-operating mode).

Under the control of the control unit, the motor driver $1a$ applies the DC voltage Vdc to the linear vibration motor $100$ so that the DC current Idc is supplied to the linear vibration motor $100$ (step S31). At this time, the level of the DC current Idc supplied to the linear vibration motor $100$ is increased gradually in stages.

Then, when the mover has arrived at the predetermined position Pdet as a result of the application of the DC voltage Vdc, the predetermined position arrival detection unit $6c$ outputs a binary signal indicating that the mover has arrived at the predetermined position, i.e., outputs a detection signal Sp having a value [1] (step S32).

Next, the thrust detection unit $3c$ outputs thrust information If which indicates, as the thrust Fthr of the mover, a previously calculated drag that is required to keep the mover at the predetermined position against the spring force of the spring member that supports the mover (step S33).

Further, the thrust constant decision unit $4c$ detects a value Idc(3) of the DC current Idc that is supplied to the linear vibration motor $100$ when the detection signal Sp is inputted from the predetermined position arrival detection unit $6c$, then performs an arithmetic operation of dividing the thrust Fthr indicated by the thrust information If from the thrust detection unit $3c$ by the current value Idc(3), thereby to decide the motor thrust constant $\alpha$, and outputs thrust constant information I$\alpha$ indicating the thrust constant $\alpha$ (step S34).

The operation of the mover driver $1a$ in the operating mode is the same as in the first or second embodiment.

That is, when the motor driver $1a$ applies the AC voltage Vac as a driving voltage to the linear vibration motor $100$, the normal operation of the linear vibration motor $100$ is started.

While the linear vibration motor $100$ is operating, the position calculation for obtaining the mover position by the mover position calculation unit $2a$ is performed using the motor thrust constant $\alpha$ obtained from steps S31 to S34, and then the motor driver $1a$ controls the AC voltage Vac applied to the linear vibration motor $100$ according to the mover position obtained by the position calculation.

As described above, the motor driving apparatus $101c$ according to the third embodiment for driving the linear vibration motor $100$ includes the motor driver $1a$ which applies the DC voltage Vdc to the linear vibration motor $100$, the predetermined position arrival detection unit $6c$ which detects that the mover has arrived at the predetermined position Pdet as a result of the application of the DC voltage Vdc to the linear vibration motor $100$ and outputs the detection signal Sp, and the thrust detection unit $3c$ that outputs the information (thrust information) If which indicates, as the mover thrust Fthr, a drag that is required to hold the mover at the predetermined position Pdet against the spring force of the spring member. Accordingly, this apparatus calculates the thrust constant $\alpha$ of the linear vibration motor on the basis of the DC current Idc that is supplied to the linear vibration motor due to the application of the DC voltage Vdc to the linear vibration motor $100$, and the mover thrust indicated by the thrust information If from the thrust detection unit $3c$. Therefore, it is possible to calculate the motor thrust constant $\alpha$ only by detecting that the mover has arrived at the predetermined position as a result of the application of the DC voltage Vdc to the linear vibration motor $100$, whereby the calculation of the thrust constant can be realized by a simple structure.

In addition, the motor driving apparatus $101c$ detects the state of the mover for detecting whether the mover is located at the predetermined position Pdet or not. In other words, the motor driving apparatus is required to detect whether the state amount is 0 or 1. Therefore, it is possible to constitute the predetermined position arrival detection unit $6c$ by a simple sensor.

[Embodiment 4]

Figure 7:
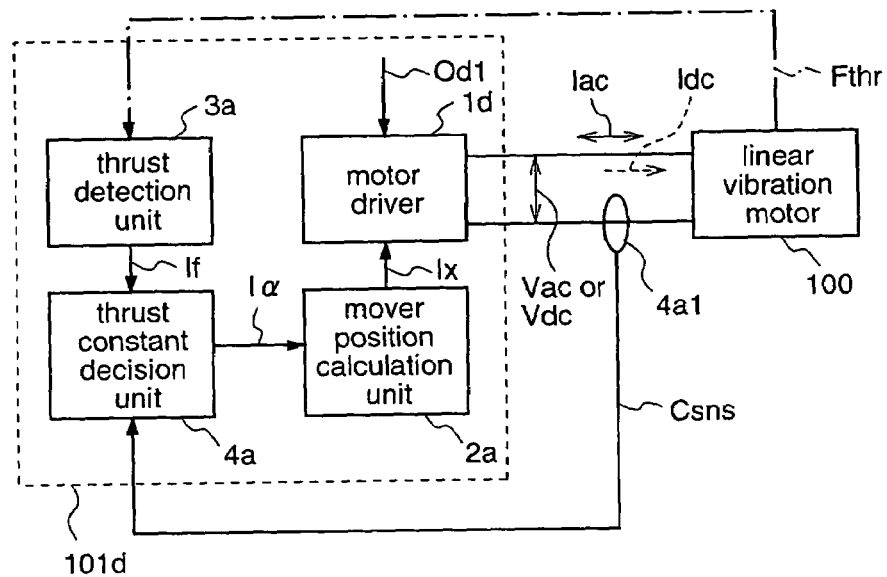
FIG. 7 is a block diagram for explaining a motor driving apparatus 101d according to a fourth embodiment of the present invention.

FIG. 7 is a block diagram for explaining a motor driving apparatus $101d$ according to a fourth embodiment of the present invention.

The motor driving apparatus $101d$ according to the fourth embodiment is different from the motor driving apparatus $101a$ according to the first embodiment only in that the apparatus $101d$ calculates the thrust constant $\alpha$ of the linear vibration motor $100$ immediately before the operation of the linear vibration motor and, while the linear vibration motor $100$ is operating, performs position calculation for obtaining the position of the mover on the basis of the motor thrust constant $\alpha$ that has been calculated immediately before the operation.

More specifically, the motor driving apparatus $101d$ according to the fourth embodiment includes, in place of the motor driver $1a$ in the motor driving apparatus $101a$ according to the first embodiment, a motor driver $1d$ having two modes, i.e., an operating mode for applying a driving voltage (AC voltage) Vac to the linear vibration motor $100$ so as to activate the linear vibration motor $100$, and a thrust constant calculation mode (non-operating mode) for applying the DC voltage Vdc to the linear vibration motor $100$, which detects a start instruction Od1 of the linear vibration motor $100$ and temporarily goes into the thrust constant calculation mode at the start of the operation of the linear vibration motor so as to calculate the motor thrust constant $\alpha$. The motor driving apparatus $101d$ further includes a control unit (not shown) that outputs the start instruction Od1 of the linear vibration motor $100$ according to a user operation.

Other constituents of the motor driving apparatus 101d are the same as those of the motor driving apparatus 101a according to the first embodiment.

Next, the operation of the motor driving apparatus will be described.

Figure 8:
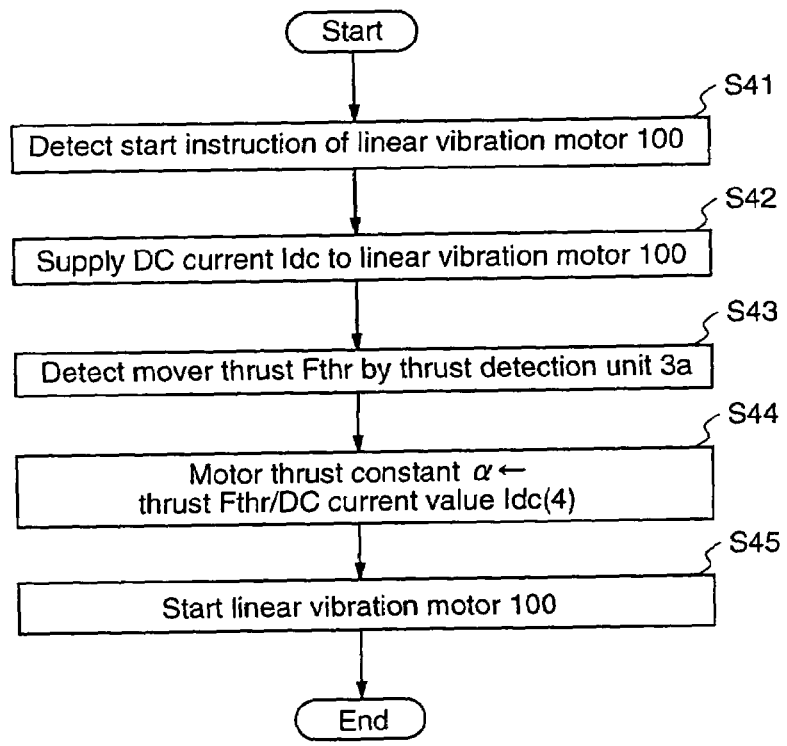
FIG. 8 is a flowchart for explaining an operation of the motor driving apparatus 101d according to the fourth embodiment.

FIG. 8 is a flowchart for explaining the operation of the motor driving apparatus 101d according to the fourth embodiment of the present invention. This figure shows an operation of the motor driving apparatus for calculating the motor thrust constant α.

The motor driver 1d detects the start instruction Od1 of the linear vibration motor 100, i.e., detects information that indicates start of a reciprocating motion of the mover, and performs the control so that the operation mode temporarily is changed to the thrust constant calculation mode, whereby the linear vibration motor goes into a temporary halt state (step S41).

Next, the motor driver 1d applies the DC voltage Vdc to the linear vibration motor 100 so that the DC current Idc is supplied to the linear vibration motor 100 (step S42).

Then, the thrust detection unit 3a detects an electromagnetic force (thrust of the mover) Fthr that acts on the mover of the linear vibration motor in a state where a value Idc(4) of the DC current Idc that is supplied to the linear vibration motor 100 due to the application of the DC voltage Vdc is maintained (step S43).

Further, the thrust constant decision unit 4a performs an arithmetic operation of dividing the thrust Fthr of the mover detected in step S43, by the value Idc(4) of the DC current Idc passing through the linear vibration motor 100, thereby to obtain the motor thrust constant α (step S44).

Thereafter, the operation mode of the motor driver 1d is changed from the thrust constant calculation mode to the operating mode, in which the motor driver 1d applies the AC voltage Vac as a driving voltage to the linear vibration motor 100. Thereby, the reciprocating motion of the mover of the linear vibration motor is started to perform the normal operation of the linear vibration motor (step S45).

In the state where the linear vibration motor is operating, the mover position calculation unit 2a performs an arithmetic operation of calculating the mover position from the AC voltage Vac and the AC current Iac which are applied to the linear vibration motor 100, on the basis of the calculated motor thrust constant α, and then the motor driver 1a controls the AC voltage Vac applied to the linear vibration motor 100 on the basis of the calculated mover position, so that the mover that is reciprocating does not exceed its critical position.

As described above, the motor driving apparatus 101d according to the fourth embodiment for driving the linear vibration motor 100 includes the motor driver 1d having two modes, i.e., the operating mode for applying the driving voltage Vac to the linear vibration motor 100 so as to start the operation of the linear vibration motor 100 and the thrust constant calculation mode for applying the DC voltage Vdc to the linear vibration motor 100, which detects a start instruction Od1 of the linear vibration motor 100, thereby temporarily changing its operation mode to the thrust constant calculation mode so as to calculate the motor thrust constant at the start of the operation of the linear vibration motor, and calculates the motor thrust constant of the linear vibration motor immediately before the operation. Therefore, it is possible to use a proper value of the motor thrust constant corresponding to the respective linear vibration motor at the calculation of the mover position, thereby increasing the accuracy of the mover position calculation.

Further, in this fourth embodiment, the processing for calculating the motor thrust constant is performed immediately before the operation of the linear vibration motor, whereby the processing for calculating the mover position can be performed always using the motor thrust constant in the latest state of the linear vibration motor. Therefore, even when the motor thrust constant varies with time, high accuracy position calculation can be performed.

In this fourth embodiment, the description has been given of the motor driving apparatus 101d that includes, in place of the motor driver 1a in the motor driving apparatus 101a according to the first embodiment, the motor driver 1d having two modes, i.e., the operating mode and the thrust constant calculation mode, which detects a start instruction of the linear vibration motor 100, thereby temporarily changing its operation mode to the thrust constant calculation mode so as to perform the calculation of the motor thrust constant α at the start of the operation of the linear vibration motor. However, the motor driving apparatus 101d may includes the above-mentioned motor driver 1d, in place of the motor driver 1a of the motor driving apparatus 101c according to the second embodiment or third embodiment.

[Embodiment 5]

Figure 9:
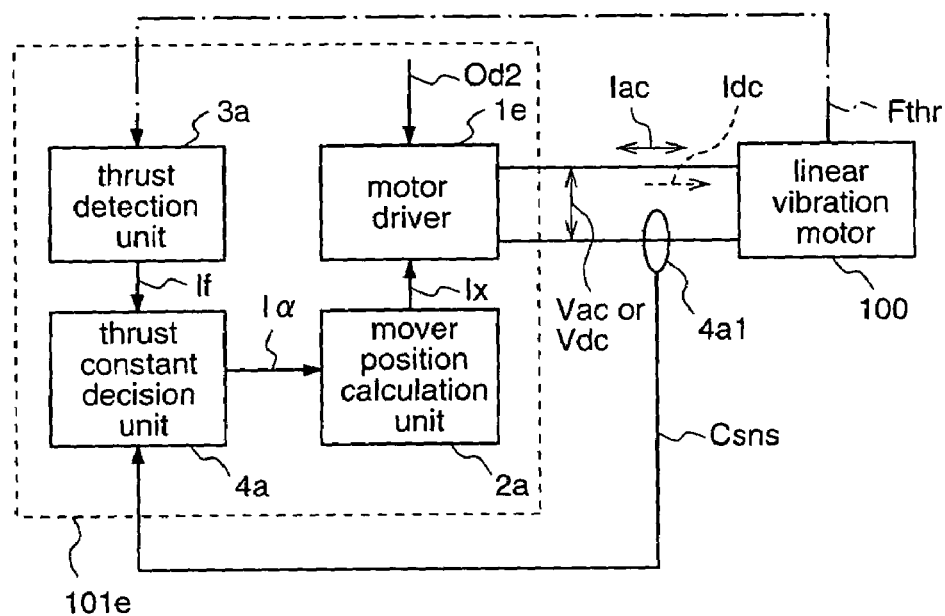
FIG. 9 is a block diagram for explaining a motor driving apparatus 101e according to a fifth embodiment of the present invention.

FIG. 9 is a block diagram for explaining a motor driving apparatus 101e according to a fifth embodiment of the present invention.

The motor driving apparatus 101e according to the fifth embodiment is different from the motor driving apparatus 101a according to the first embodiment only in that the apparatus 101e calculates the thrust constant α of the linear vibration motor 100 immediately after the operation of the linear vibration motor 100 and, while the linear vibration motor 100 is operating, performs position calculation for obtaining the position of the mover using the motor thrust constant α calculated immediately after the end of the previous operation.

More specifically, the motor driving apparatus 101e according to the fifth embodiment includes, in place of the motor driver 1a of the motor driving apparatus 101a according to the first embodiment, a motor driver 1e that has two modes, i.e., an operating mode of applying a driving voltage (AC voltage) Vac to the linear vibration motor 100 so as to start the operation of the linear vibration motor 100, and a thrust constant calculation mode (non-operating mode) of applying the DC voltage Vdc to the linear vibration motor 100, and detects a halt instruction Od2 of the linear vibration motor 100, thereby temporarily changing its operation mode to the thrust constant calculation mode so that the calculation of the motor thrust constant α is performed immediately after the end of the operation of the linear vibration motor 100. The motor driving apparatus 101e further includes a control unit (not shown) that outputs the halt instruction Od2 of the linear vibration motor 100 according to a user operation.

Further, the mover position calculation unit 2a in the motor driving apparatus 101e according to the fifth embodiment utilizes the motor thrust constant that has been calculated immediately after the end of the operation of the linear vibration motor, in the arithmetic operation for calculating the position of the mover during the next operation of the linear vibration motor.

Other constituents of the motor driving apparatus 101e according to the fifth embodiment are the same as those of the motor driving apparatus 101a according to the first embodiment.

Next, the operation of the motor driving apparatus will be described.

Figure 10:
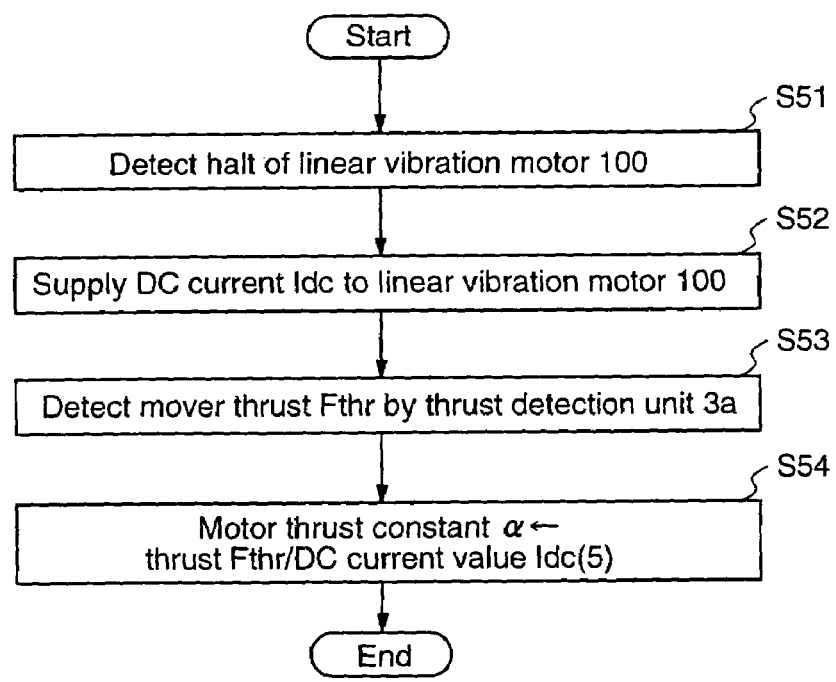
FIG. 10 is a flowchart for explaining an operation of the motor driving apparatus 101e according to the fifth embodiment.

FIG. 10 is a flowchart for explaining the operation of the motor driving apparatus 101e according to the fifth embodiment. This figure shows an operation of the motor driving apparatus for calculating the motor thrust constant α.

When detecting a halt instruction Od2 that instructs a halt of the operation of the linear vibration motor (step S51), the motor driver 1e stops applying the driving voltage (AC voltage) Vac to the linear vibration motor.

Then, when the operation of the mover of the linear vibration motor 100 is completely stopped, the motor driver 1e temporarily changes its operation mode to the thrust constant calculation mode, thereby applying the DC voltage Vdc so that the DC current Idc is supplied to the linear vibration motor 100 (step S52).

Then, the thrust detection unit 3a detects an electromagnetic force (thrust of the mover) Fthr that acts on the mover of the linear vibration motor in the state where the value Idc(5) of the DC current Idc that is supplied to the linear vibration motor 100 due to the application of the DC voltage Vdc is maintained (step S53).

Further, the thrust constant decision unit 4a performs an arithmetic operation of dividing the mover thrust Fthr detected in step S53, by the value Idc(5) of the DC current Idc passing through the linear vibration motor 100, thereby calculating the motor thrust constant α (step S54).

Thereafter, when detecting a start instruction of the linear vibration motor 100, the motor driver 1e applies the AC voltage Vac to the linear vibration motor 100 as a driving voltage. Thereby, the normal operation of the linear vibration motor 100 is performed.

While the linear vibration motor 100 is operating, the mover position calculation unit 2a performs position calculation for obtaining the mover position using the motor thrust constant α that has been obtained in step S51 to S54 after the end of the previous operation, and the motor driver 1e controls the AC voltage Vac that is applied to the linear vibration motor 100 according to the mover position obtained by the position calculation so that the mover that is reciprocating does not exceed its critical position.

As described above, the motor driving apparatus 101e according to the fifth embodiment for driving the linear vibration motor 100 includes the motor driver 1e having two modes, i.e., the operating mode of applying the driving voltage Vac to the linear vibration motor 100 so as to activate the linear vibration motor 100 and the thrust constant calculation mode of applying the DC voltage Vdc to the linear vibration motor 100, which detects a halt instruction Od2 of the linear vibration motor 100, thereby temporarily changing its operation mode to the thrust constant calculation mode so that the calculation of the motor thrust constant is performed at the end of the operation of the linear vibration motor. Thereby, this apparatus calculates the motor thrust constant of the linear vibration motor immediately after the end of the operation of the linear vibration motor, and utilizes the calculated motor thrust constant in the position calculation for obtaining the position of the mover during the next operation of the linear vibration motor. Accordingly, it is possible to use a proper value of the motor thrust constant corresponding to the respective linear vibration motor at the mover position calculation, thereby increasing the accuracy in the mover position calculation.

Further, in this fifth embodiment, the processing for calculating the motor thrust constant is performed immediately after the end of the operation of the linear vibration motor. Therefore, the position calculation for obtaining the mover position is performed always using the motor thrust constant in the latest state of the linear vibration motor, whereby even when the motor thrust constant varies with time, a high accuracy position calculation can be achieved.

Further, as the calculation of the motor thrust constant is performed immediately after the end of the operation of the linear vibration motor, the motor thrust constant is calculated in a state where the temperature of the motor is approximately the same as the temperature while the linear vibration motor has been actually working. That is, although the motor thrust constant varies according to the temperature, a correct motor thrust constant during the operation of the linear vibration motor can be obtained by calculating the thrust constant at a temperature when the motor is actually working. Accordingly, the position calculation for obtaining the mover position can be achieved with high accuracy.

Further, as the calculation of the motor thrust constant is performed after stopping the linear vibration motor, it is possible to obtain the motor thrust constant without hindering the operation of the linear vibration motor.

In this fifth embodiment, the description has been given of the motor driving apparatus 101e which has, in place of the motor driver 1a in the motor driving apparatus 101a according to the first embodiment, the motor driver 1e that has two modes, i.e., the operating mode and the thrust calculation mode, and temporarily changes its operation mode to the thrust constant calculation mode so as to calculate the motor thrust constant α immediately after the end of the operation of the linear vibration motor 100. However, the motor driving apparatus 101e may include the motor driver 1e in place of the motor driver 1a in the motor driving apparatus 101c according to the second or third embodiment.

[Embodiment 6]

Figure 11:
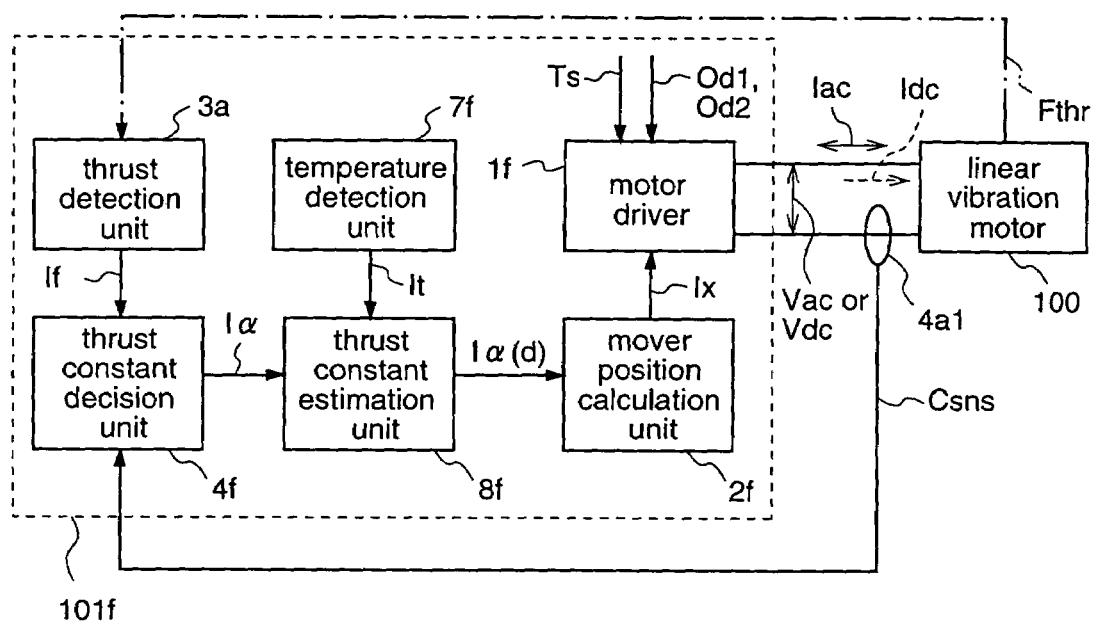
FIG. 11 is a block diagram for explaining a motor driving apparatus 101f according to a sixth embodiment of the present invention.

FIG. 11 is a block diagram for explaining a motor driving apparatus 101f according to a sixth embodiment of the present invention.

The motor driving apparatus 101f according to the sixth embodiment is different from the motor driving apparatus 101a according to the first embodiment only in that the apparatus 101f derives a relationship between the thrust constant α of the linear vibration motor and the motor temperature T (thrust constant-temperature function) Q in a non-operating state of the linear vibration motor 100 and, while the linear vibration motor 100 is operating, estimates the motor thrust constant α(d) in the operating state of the linear vibration motor 100 from a detected motor temperature T(d) based on the thrust constant-temperature function Q, thereby performing the position calculation for obtaining the mover position using the estimated motor thrust constant α(d).

That is, the motor driving apparatus 101f according to the sixth embodiment includes a motor driver 1f that has an operating mode of applying a driving voltage to the linear vibration motor 100 so as to activate the linear vibration motor 100, and a non-operating mode (thrust constant calculation mode) of applying a DC voltage Vdc to the linear vibration motor 100 so that the thrust Fthr of the mover of the linear vibration motor 100 is generated, and temporarily changes its operation mode to the non-operating mode at the start and end of the operation of the linear vibration motor 100 in a state where the linear vibration motor 100 is not operating. The motor driving apparatus 101f further includes a control unit (not shown) that generates a timing signal Ts at prescribed intervals, for example at intervals of 30 minutes or one hour, and outputs a start instruction Od1 and a halt instruction Od2 of the linear vibration motor 100 according to the user operation, and an operation judging unit (not shown) that, when detecting one of the timing signal Ts, the start instruction Od1 and the halt instruction Od2, judges whether the linear vibration motor 100 is operating or not, i.e., whether the mover is in an operating state or in a halting state.

To be more specific, in the case where the start instruction Od1 of the linear vibration motor from outside is detected in a state where a driving voltage (for example, AC voltage Vac) is not applied to the linear vibration motor 100, the motor driver 1*f* temporarily changes its operation mode to the non-operating mode when the linear vibration motor is at rest, while when the linear vibration motor is not at rest, the motor driver 1*f* temporarily changes the operation mode to the non-operating mode after the linear vibration motor has stopped. Further, when the halt instruction Od2 of the linear vibration motor 100 from outside is detected in the state where the driving voltage Vac is applied to the linear vibration motor 100, the motor driver 1*f* temporarily changes its operation mode to the non-operating mode after the linear vibration motor has stopped. Further, in the case where the linear vibration motor is standing still when the timing signal Ts is detected, the motor driver 1*f* temporarily changes its operation mode to the non-operating mode, while in the case where the linear vibration motor is not standing still when the timing signal is detected, the motor driver 1*f* temporarily changes its operation mode to the non-operating mode after the operation of the linear vibration motor has stopped.

In this case, the motor driver 1*f* temporarily changes the operation mode to the non-operating mode at the start and end of the operation of the linear vibration motor 100, while the motor driver 1*f* may temporarily change its operation mode to the non-operating mode at either the start or end of the operation of the linear vibration motor 100.

The motor driving apparatus 101*f* has a temperature detection unit 7*f* for detecting the temperature (motor temperature) T of the linear vibration motor 100 and outputting temperature information It which indicates the detected motor temperature T. The temperature detection unit 7*f* comprises a temperature sensor that is mounted on the linear vibration motor 100, and the like.

The motor driving apparatus 101*f* includes a thrust detection unit 3*a* for detecting a thrust Fthr of the mover, which is generated by the DC voltage Vdc applied to the linear vibration motor 100, and outputting information (thrust information) If indicating the thrust Fthr of the mover, and a thrust constant decision unit 4*f* for deciding a thrust constant α of the linear vibration motor 100, on the basis of the detected thrust Fthr of the mover and the DC current Idc that is supplied to the linear vibration motor 100 by the application of the DC voltage Vdc.

Here, the thrust detection unit 3*a* is the same as that in the motor driving apparatus 101*a* according to the first embodiment. The thrust constant decision unit 4*f* performs an arithmetic operation of dividing the mover thrust Fthr detected by the thrust detection unit 3*a*, by a current value Idc(6) of the DC current Idc that is supplied to the linear vibration motor 100, thereby deciding the motor thrust constant α, and outputs thrust constant information Iα which indicates the decided motor thrust constant α.

The motor driving apparatus 101*f* further includes a thrust constant estimation unit 8*f* that derives, in the non-operating state of the linear vibration motor 100, a relationship (thrust constant-temperature function) Ω between the motor thrust constant α and the motor temperature T that has been detected at the calculation of the motor thrust constant α on the basis of the thrust constant information Iα from the thrust constant decision unit 4*f* and the motor temperature information It from the temperature detection unit 7*f* and, in the operating state of the linear vibration motor 100, estimates the motor thrust constant α(d) of the operating state on the basis of the motor temperature T(d) that has been detected in the operating state, according to the derived thrust constant-temperature function Q; and a mover position calculation unit 2*f* for performing an arithmetic operation for calculating the position Xcul of the mover while the linear vibration motor is operating, using the motor thrust constant α(d) that has been obtained in the processing by the thrust constant estimation unit 8*f*.

Here, the thrust constant-temperature function Q may be a linear function with the calculated motor thrust constant α and the detected motor temperature T being taken as variables, or a 2D matrix that indicates correspondences between the motor thrust constant α and the motor temperature T.

Further, the mover position calculation unit 2*f* obtains the position of the mover by an arithmetic operation while the linear vibration motor 100 is operating. As a specific method, the method as described in Japanese Unexamined Patent Publication No. Hei. 8-508558 that has been explained as the prior art is employed, in which the position of the mover is calculated according to the equation of motion for the linear vibration motor 100. However, the thrust constant that is used in the arithmetic operation for calculating the mover position by this mover position calculation unit 2*f* is the motor thrust constant α(d) in the operating state, which is obtained by the motor thrust constant estimation unit 8*f*.

Next, the operation of the motor driving apparatus will be described.

Figure 12:
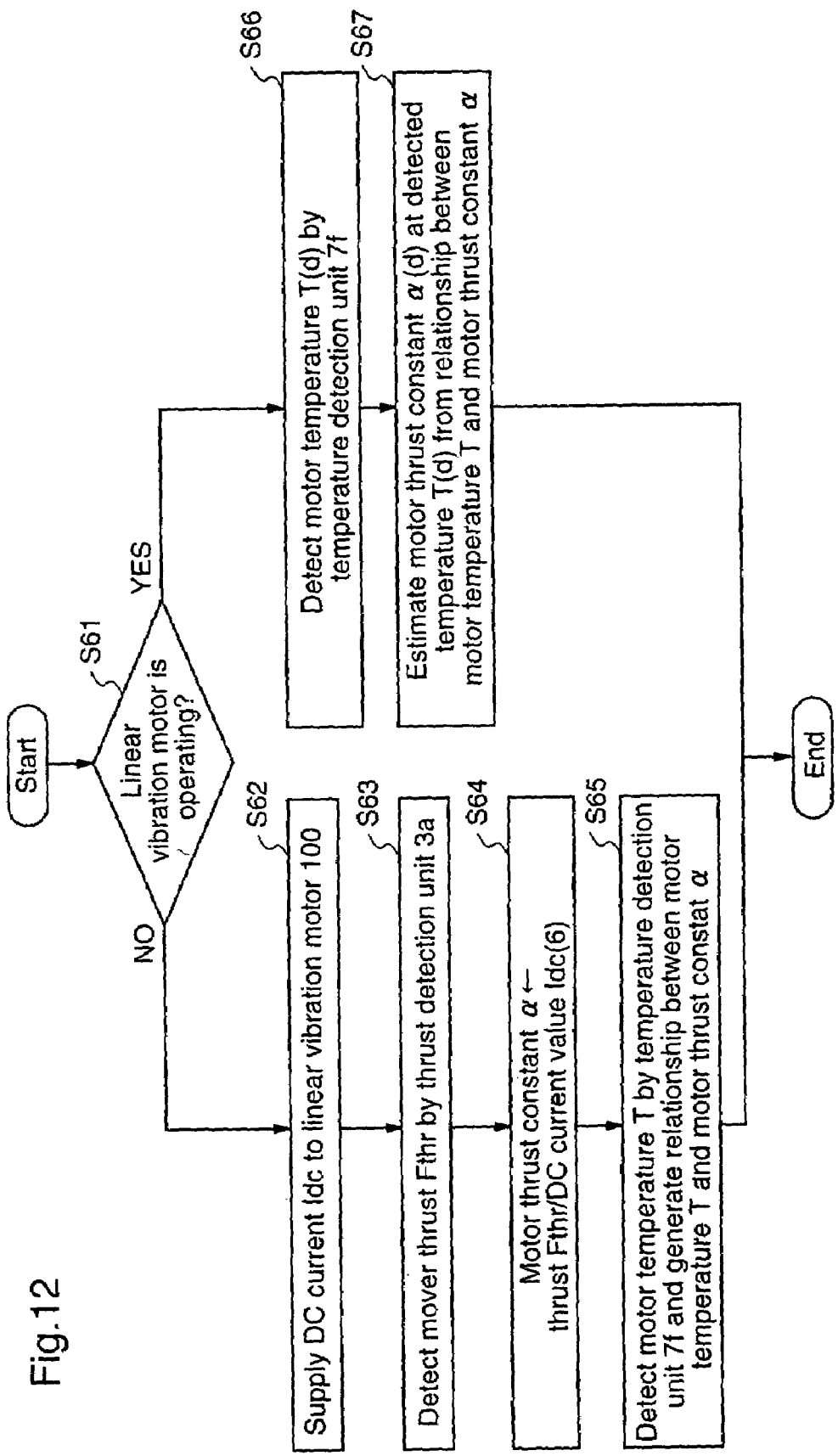
FIG. 12 is a flowchart for explaining an operation of the motor driving apparatus 101f according to the sixth embodiment.
Figure 13:
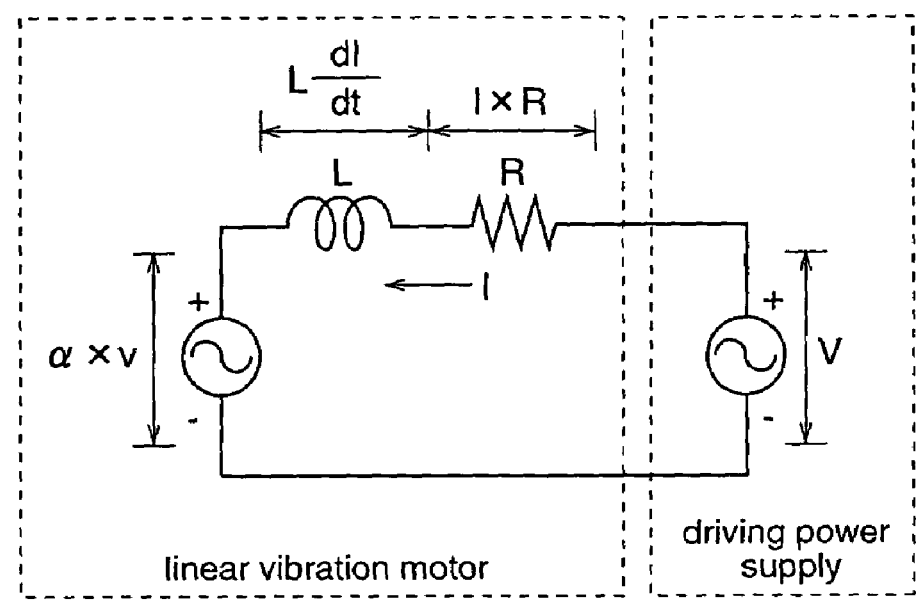
FIG. 13 is a diagram illustrating an equivalent circuit of a linear vibration motor according to the present invention and the prior art.
Figure 14:
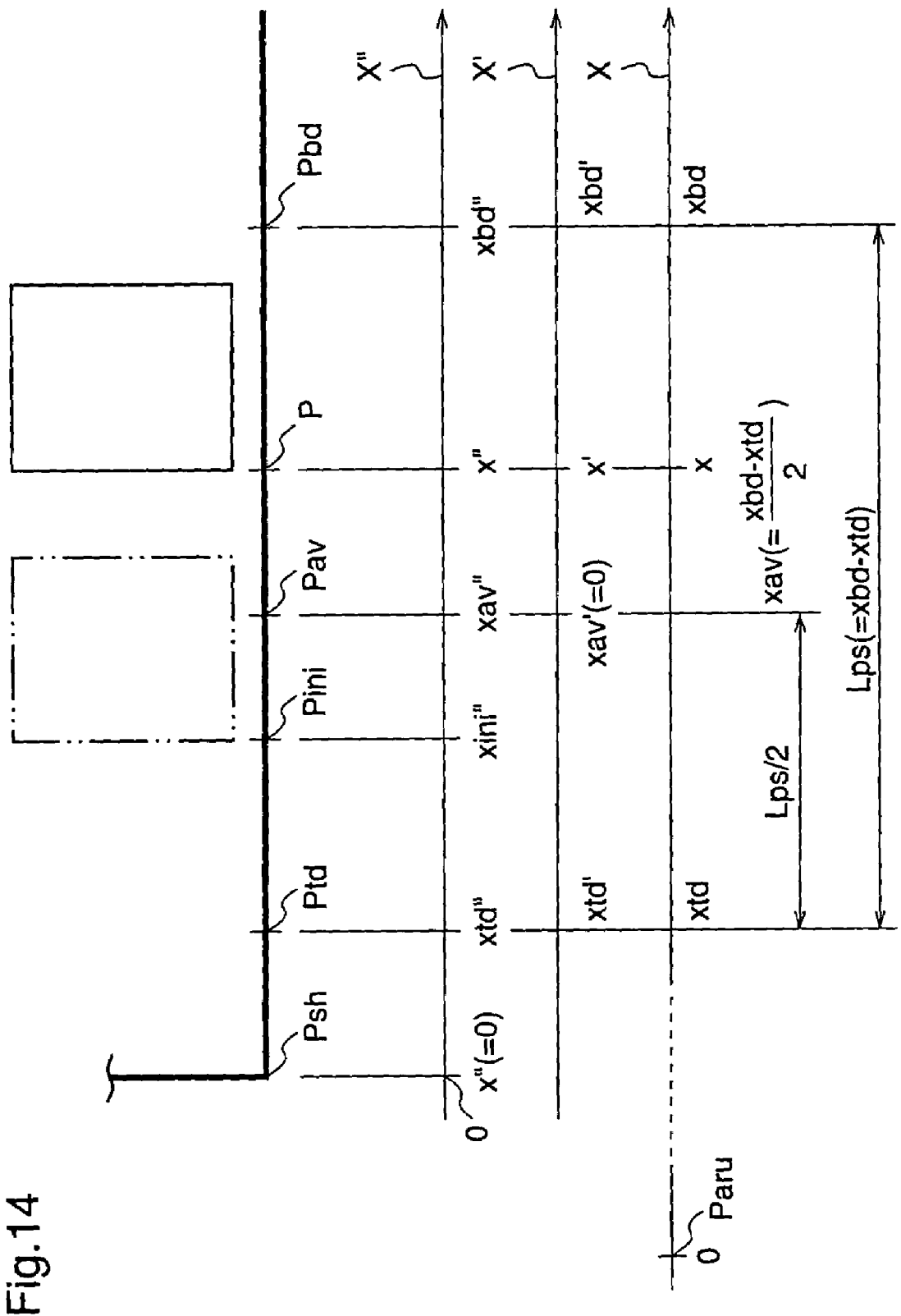
FIG. 14 is a schematic diagram for explaining processing for calculating the position of the mover in the linear vibration motor using an equation of motion.

FIG. 12 is a flowchart for explaining the operation of the motor driving apparatus 101*f* according to the sixth embodiment. This figure shows an operation of the motor driving apparatus for deriving the thrust constant-temperature function Q and estimating the motor thrust constant. In this motor driving apparatus 101*f*, when one of the timing signal, the start instruction, and the halt instruction of the linear vibration motor 100 is detected, either the processing for deriving the thrust constant-temperature function Q or the processing for estimating the motor thrust constant α(d) in the operating state is performed according to whether the linear vibration motor 100 is operating or not.

That is, when detecting one of the timing signal, the start instruction, and the halt instruction of the linear vibration motor 100, the operation judging unit (not shown) in the motor driving apparatus 101*f* judges whether the linear vibration motor 100 is operating or not (step S61).

When it is judged in step S61 that the linear vibration motor 100 is not operating, the motor driver 1*f* changes its operation mode to the non-operating mode, thereby applying the DC voltage Vdc to the linear vibration motor 100 so that the DC current Idc is supplied to the linear vibration motor 100 (step S62).

Next, the thrust detection unit 3*a* detects an electromagnetic force (thrust of the mover) Fthr that acts on the mover of the linear vibration motor 100 in the state where the value Idc(6) of the DC current Idc is supplied to the linear vibration motor 100 due to the application of the DC voltage Vdc is maintained (step S63).

Subsequently, the thrust constant decision unit 4*f* performs an arithmetic operation of dividing the thrust Fthr of the mover detected in step S63, by the value Idc(6) of the DC current Idc that passes through the linear vibration motor 100, thereby obtaining the motor thrust constant α (step S64).

Then, the temperature detection unit 7f detects the motor temperature T(s) in the non-operating state, and the thrust constant estimation unit 8f generates a correspondence (thrust constant-temperature function) Q between the motor temperature T and the motor thrust constant α on the basis of the temperature information It which indicates the motor temperature T(s) and the thrust constant information Iα from the thrust constant decision unit 4f (step S65).

On the other hand, when it is judged in step S61 that the linear vibration motor 100 is operating, the temperature detection unit 7f detects the temperature T(d) of the linear vibration motor 100 being operating (step S66), and the thrust constant estimation unit 8f estimates the motor thrust constant α(d) of the linear vibration motor being operating, on the basis of the relationship (thrust constant-temperature function) Q between the motor temperature T and the motor thrust constant α obtained in step S65 and the motor temperature T(d) in the operating state detected in step S66, and outputs information Iα(d) indicating the estimated motor thrust constant to the mover position calculation unit 2f (step S67).

Then, in the state where the linear vibration motor 100 is operating, the mover position calculation unit 2f performs position calculation for obtaining the mover position on the basis of the driving current and the driving voltage which are applied to the linear vibration motor 100, using the motor thrust constant α(d) in the operating state, which has been obtained from steps S61 to S67, and outputs mover position information Ix which indicates the obtained mover position Xcul to the motor driver 1f. Then, the motor driver 1f controls the driving voltage applied to the linear vibration motor 100 on the basis of the mover position information Ix, so that the mover which is reciprocating does not exceed its critical position.

As described above, the motor driving apparatus 101f for driving the linear vibration motor 100 according to the sixth embodiment includes the thrust detection unit 3a that detects the mover thrust Fthr generated by the DC voltage Vdc that is applied to the linear vibration motor 100, the thrust constant decision unit 4f that decides the motor thrust constant α on the basis of the detected mover thrust Fthr and the DC current Idc that is supplied to the linear vibration motor 100, the temperature detection unit 7f that detects the temperature of the linear vibration motor, and the thrust constant estimation unit 8f that derives, in the state where the linear vibration motor is not operating, the relationship Q between the motor thrust constant a and the motor temperature T on the basis of the detected motor temperature T and the decided motor thrust constant α and, in the state where the linear vibration motor is operating, estimates the motor thrust constant α(d) in the operating state according to the thrust constant-temperature function Q on the basis of the motor temperature T(d) detected in the operating state. Therefore, the calculation of the mover position in the state where the linear vibration motor is operating can be performed using a proper motor thrust constant, thereby increasing the accuracy in the calculation of the mover position.

Further, in this sixth embodiment, the processing for calculating the motor thrust constant is performed immediately before and immediately after the operation of the linear vibration motor. Therefore, the position calculation is performed always on the basis of the motor thrust constant in the latest state of the linear vibration motor. Accordingly, even when the motor thrust constant varies with time, a high accuracy calculation of the mover position can be achieved.

Further, as the motor thrust constant α(d) of the linear vibration motor which is in the operating state is estimated from the motor temperature T(d) detected at a time when the motor is actually working, the position calculation can be achieved with high accuracy using a proper thrust constant even in the state where temperature variations in the linear vibration motor are great.

In this sixth embodiment, the description has been given of the motor driving apparatus 101f including the thrust detection unit 3a that is the same as that in the motor driving apparatus 101a according to the first embodiment. However, the motor driving apparatus 101f according to the sixth embodiment may includes, in place of the above-mentioned thrust detection unit 3a, the moving distance detection unit 5b and the thrust detection unit 3b of the motor driving apparatus 101b according to the second embodiment. Further, the motor driving apparatus 101f according to the sixth embodiment may include, in place of the thrust detection unit 3a, the predetermined position arrival detection unit 6c and the thrust detection unit 3c according to the third embodiment, and the thrust constant decision unit 4f that decides the thrust constant α of the linear vibration motor in the same manner as the thrust constant decision unit 4c according to the third embodiment.

Further, in this sixth embodiment, the thrust constant estimation unit 8f performs the processing of estimating the motor thrust constant α(d) in the operating state, when one of the timing signal, the start instruction, and the end instruction is detected. However, the thrust constant estimation unit 8f may performs the processing of estimating the motor thrust constant α(d) in the operating state only when the timing signal is detected.

[Embodiment 7]

Figure 15:
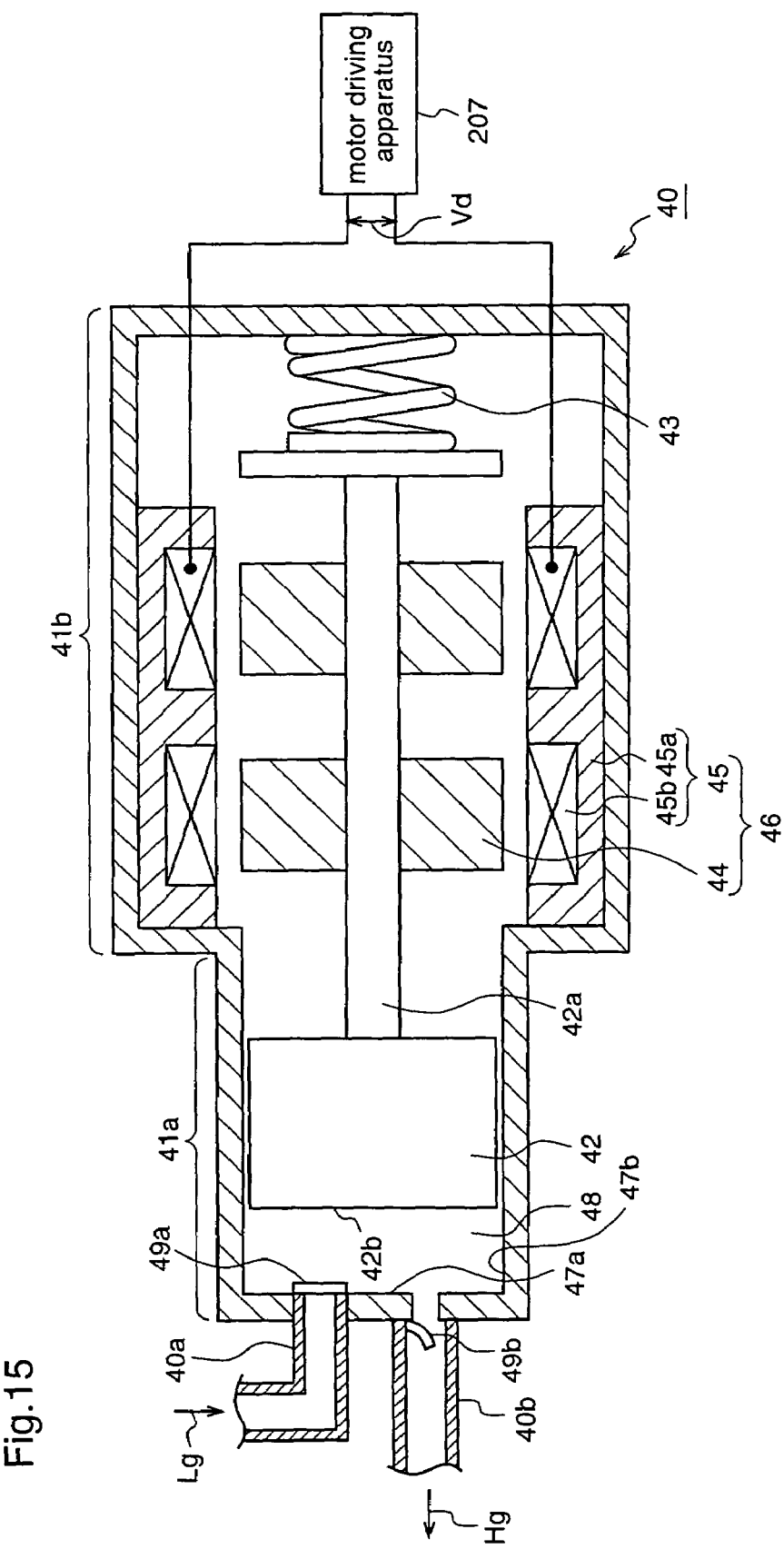
FIG. 15 is a schematic diagram for explaining a motor driving apparatus 207 according to a seventh embodiment of the present invention.

FIG. 15 is a schematic diagram for explaining a compressor driving apparatus according to a seventh embodiment of the present invention.

A compressor driving apparatus 207 according to the seventh embodiment drives a compressor 40 for compressing air, gas, or the like. A power source of the compressor 40 is a linear vibration motor 46 which is identical to the linear vibration motor 100 according to the first embodiment. Further, the compressor driving apparatus 207 is a motor driving apparatus for driving the linear vibration motor 46, and it has the same construction as the motor driving apparatus 101a of the first embodiment. Hereinafter, the compressor 40 according to this seventh embodiment is referred to as a linear compressor, and this linear compressor 40 will be briefly described.

The linear compressor 40 has a cylinder section 41a and a motor section 41b which are adjacent to each other along a predetermined axis line. In the cylinder section 41a, a piston 42 which is slidably supported along the axis direction is placed. A piston rod 42a an end of which is fixed to the rear side of the piston 42 is placed across the cylinder section 41a and the motor section 41b, and a support spring 43 which applies a force to the piston rod 42a in the axis direction is provided on the other end of the piston rod 42a.

Further, a magnet 44 is fixed to the piston rod 42a, and an electromagnet 45 comprising an outer yoke 45a and a stator coil 45b embedded in the outer yoke 45a is fixed to a portion of the motor section 41b which is opposed to the magnet 44. In this linear compressor 40, the linear vibration motor 46 is constituted by the electromagnet 45 and the magnet 44 fixed to the piston rod 42a. Accordingly, in the linear compressor 40, the piston 42 reciprocates in its axis direction due to an electromagnetic force generated between the electromagnet 45 and the magnet 44, and elasticity of the spring 43.

Further, in the cylinder section 41a, a compression chamber 48 is formed, which is a closed space surrounded by a cylinder upper portion inner wall 47a, a piston compression wall 42b, and a cylinder peripheral wall 47b. An end of an inlet tube 40a for sucking a low-pressure gas Lg into the compression chamber 48 is opened at the cylinder upper portion inner wall 47a. Further, an end of a discharge tube 40b for discharging a high-pressure gas Hg from the compression chamber 48 is opened at the cylinder upper portion inner wall 47a. An inlet valve 49a and a discharge valve 49b for preventing back flow of the gas are fixed to the inlet tube 40a and the discharge tube 40b, respectively.

In the linear compressor 40 so constructed, the piston 42 reciprocates in its axis direction by application of the driving voltage from the motor driving apparatus 207 to the linear vibration motor 46, whereby suction of the low-pressure gas Lg into the compression chamber 48, compression of the gas in the compression chamber 48, and discharge of the compressed high-pressure gas Hg from the compression chamber 48 are repeatedly carried out.

In the linear compressor 40 according to the seventh embodiment, the motor driving apparatus 207 calculates the motor thrust constant in the non-operating mode of the linear vibration motor and then calculates the position of the mover of the linear vibration motor using the calculated motor thrust constant in the operating mode of the linear vibration motor, as in the motor driving apparatus 101a according to the first embodiment. Therefore, it is possible to detect the position of the piston with high accuracy during the operation of the linear compressor 40. Accordingly, the clearance between the piston and the cylinder head can be reduced, resulting in miniaturization of the linear compressor.

[Embodiment 8]

Figure 16:
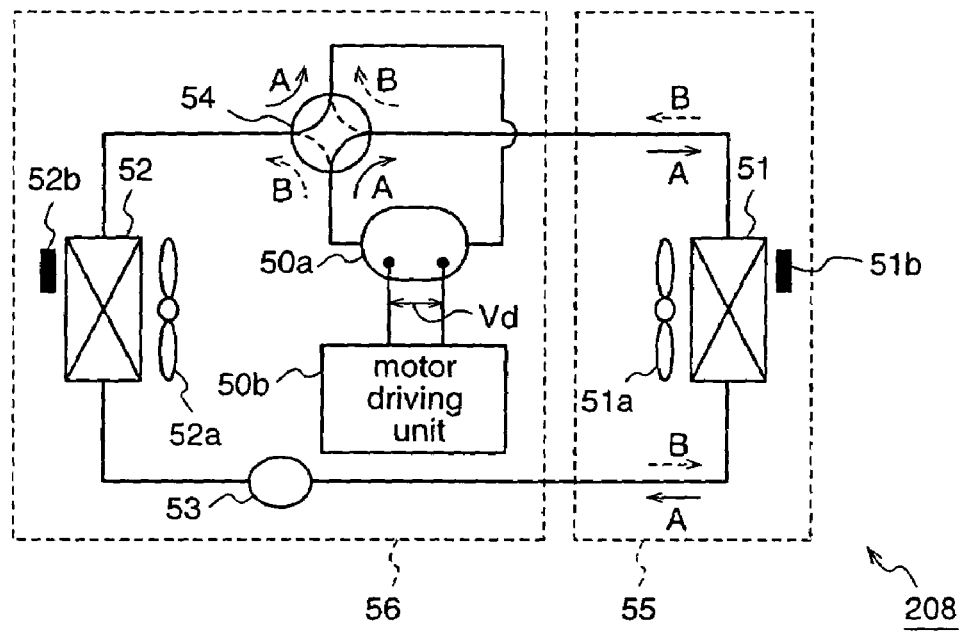
FIG. 16 is a schematic diagram for explaining an air conditioner 208 according to an eighth embodiment of the present invention.

FIG. 16 is a block diagram for explaining an air conditioner according to an eighth embodiment of the present invention.

An air conditioner 208 according to the eighth embodiment has an indoor unit 55 and an outdoor unit 56, and performs cooling and heating. The air conditioner 208 comprises a linear compressor 50a for circulating a refrigerant between the indoor unit 55 and the outdoor unit 56, and a compressor driving unit 50b for driving the linear compressor 50a. The compressor 50a is identical to the linear compressor 40 having the linear vibration motor 46 according to the seventh embodiment. Further, the compressor driving unit 50b is a motor driving unit which applies the driving voltage Vd to the linear vibration motor of the linear compressor 50a, and it is identical in construction as the motor driving apparatus 207 according to the seventh embodiment.

More specifically, the air conditioner 208 has the linear compressor 50a, a four-way valve 54, a throttle (expansion valve) 53, an indoor heat exchanger 51, an outdoor heat exchanger 52, which forms a refrigerant circulation path, and the motor driving unit 50b for driving the linear vibration motor as a driving source of the linear compressor 50a.

The indoor heat exchanger 51 constitutes the indoor unit 55, while the throttle 53 the outdoor heat exchanger 52, the linear compressor 50a, the four-way valve 54, and the motor driving unit 50b constitute the outdoor unit 56.

The indoor heat exchanger 51 has an air blower 51a for increasing the efficiency of heat exchange, and a temperature sensor 51b for measuring the temperature of the heat exchanger 51 or the ambient temperature thereof. The outdoor heat exchanger 52 has an air blower 52a for increasing the efficiency of heat exchange, and a temperature sensor 52b for measuring the temperature of the heat exchanger 52 or the ambient temperature thereof.

In this eighth embodiment, the linear compressor 50a and the four-way valve 54 are placed in the refrigerant path between the indoor heat exchanger 51 and the outdoor heat exchanger 52. That is, in this air conditioner 208, the four-way valve 54 switches between two states as follows: the state where the refrigerant flows in the direction of arrow A, the refrigerant that has passed through the outdoor heat exchanger 52 is sucked into the linear compressor 50a, and the refrigerant discharged from the linear compressor 50a is supplied to the indoor heat exchanger 51, and the state where the refrigerant flows in the direction of arrow B, the refrigerant that has passed through the indoor heat exchanger 51 is sucked into the linear compressor 50a, and the refrigerant discharged from the linear compressor 50a is supplied to the outdoor heat exchanger 52.

Further, the throttle 53 has both the function of reducing the flow rate of the circulating refrigerant, and the function as a valve for automatically controlling the flow rate of the refrigerant. That is, under the state where the refrigerant is circulating in the refrigerant circulation path, the throttle 53 reduces the flow rate of the liquid refrigerant outputted from a condenser to an evaporator to expand the liquid refrigerant, and supplies a proper amount of refrigerant that is required for the evaporator.

The indoor heat exchanger 51 operates as a condenser during heating and as an evaporator during cooling. The outdoor heat exchanger 52 operates as an evaporator during heating and as a condenser during cooling. In the condenser, the high-temperature and high-pressure refrigerant gas flowing therein loses heat to the air blown into the condenser, and gradually liquefies, resulting in a high-pressure liquid refrigerant in the vicinity of the outlet of the condenser. This is equivalent to that the refrigerant radiates heat into the air to liquefy. Further, the liquid refrigerant whose temperature and pressure are reduced by the throttle 53 flows into the evaporator. When the indoor air is blown into the evaporator in this state, the liquid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

In the air conditioner 208, the motor driving unit 50b controls the output of the linear vibration motor of the linear compressor 50a on the basis of the operating conditions of the air conditioner, i.e., the target temperature set on the air conditioner and the actual room temperature and outdoor temperature.

Next, the operation of the air conditioner will be described.

In the air conditioner 208 according to the eighth embodiment, when the driving voltage Vd is supplied from the motor drive control unit 50b to the linear compressor 50a, the refrigerant circulates in the refrigerant circulation path, and heat exchange is carried out in the heat exchanger 51 of the indoor unit 55 and the heat exchanger 52 of the outdoor unit 56. That is, in the air conditioner 208, a well-known heat pump cycle is formed in the refrigerant circulation path by circulating the refrigerant sealed in the circulation path with the linear compressor 50a. Thereby, heating or cooling for a room is carried out.

For example, when the air conditioner 208 performs heating, the four-way valve 54 is set by user operation so that the refrigerant flows in the direction of arrow A. In this case, the indoor heat exchanger 51 operates as a condenser, and discharges heat due to circulation of the refrigerant in the refrigerant circulation path. Thereby, the room is heated.

Conversely, when the air conditioner 208 performs cooling, the four-way valve 54 is set by user operation so that the refrigerant flows in the direction of arrow B. In this case, the indoor heat exchanger 51 operates as an evaporator, and absorbs heat from the ambient air due to circulation of the refrigerant in the refrigerant circulation path. Thereby, the room is cooled.

In the air conditioner 208, the motor driving unit 50*b* controls the output of the linear vibration motor of the linear compressor 50*a* on the basis of the target temperature set on the air conditioner and the actual room temperature and outdoor temperature. Thereby, the air conditioner 208 performs comfortable cooling and heating.

As described above, in the air conditioner 208 according to the eighth embodiment, since the compressor (linear compressor) 50*a* having the linear vibration motor as a power source is used as the compressor for compressing and circulating a refrigerant, friction loss in the compressor is reduced as compared with an air conditioner using a compressor having a rotation-type motor as a power source, and furthermore, sealability of the compressor for sealing a high-pressure refrigerant and a low-pressure refrigerant is enhanced, resulting an increase in efficiency of the compressor.

Furthermore, in the compressor 50*a* using the linear vibration motor according to the eighth embodiment, since friction loss is reduced, the amount of use of lubricating oil that is indispensable in the compressor using the rotation-type motor can be significantly reduced. Thereby, the amount of waste oil that needs recycling or the like can be reduced, and the amount of refrigerant to be filled in the compressor can be reduced because the amount of refrigerant that dissolves into the oil is reduced, resulting in a contribution to conservation of global environment.

Further, in the air conditioner 208, the motor driving unit 50*b* calculates the motor thrust constant in the non-operating mode of the linear vibration motor and then calculates the position of the mover of the linear vibration motor using the calculated motor thrust constant in the operating mode of the linear vibration motor, as in the motor driving apparatus 207 according to the seventh embodiment. Therefore, it is possible to detect the position of the piston with high accuracy during the operation of the linear compressor 50*a*. Accordingly, the clearance between the piston and the cylinder head can be reduced, resulting in miniaturization of the linear compressor, which leads to miniaturization of the air conditioner.

[Embodiment 9]

Figure 17:
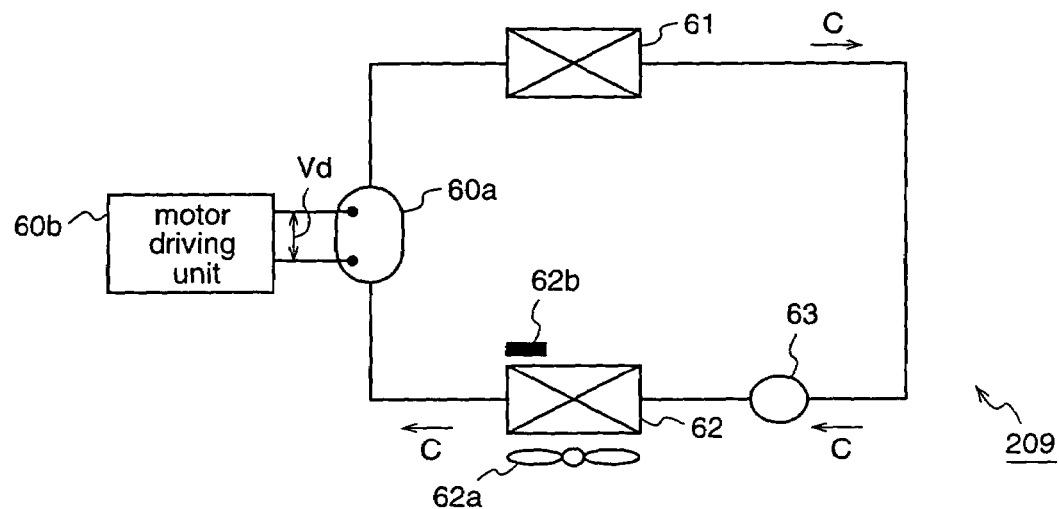
FIG. 17 is a schematic diagram for explaining a refrigerator 209 according to a ninth embodiment of the present invention.

FIG. 17 is a block diagram for explaining a refrigerator according to a ninth embodiment of the present invention.

A refrigerator 209 of this ninth embodiment comprises a linear compressor 60*a*, a compressor driving unit 60*b*, a condenser 61, an evaporator 62, and a throttle 63.

The linear compressor 60*a*, the condenser 61, the throttle 63, and the evaporator 62 form a refrigerant circulation path, and the compressor driving unit 60*b* is a motor driving unit for driving a linear vibration motor as a driving source of the linear compressor 60*a*. The linear compressor 60*a* and the motor driving unit 60*b* are identical to the linear compressor 40 and the motor driving apparatus 207 according to the seventh embodiment, respectively.

Like the throttle 53 of the air conditioner 208 according to the eighth embodiment, the throttle 63 reduces the flow rate of the liquid refrigerant outputted from the condenser 61 to expand the liquid refrigerant, and supplies a proper amount of refrigerant to the evaporator 62, under the state where the refrigerant is circulating in the refrigerant circulation path.

The condenser 61 condenses the high-temperature and high-pressure refrigerant gas flowing therein, and discharges heat of the refrigerant to the outside air. The refrigerant gas introduced in the condenser 61 loses heat to the outside air and gradually liquefies, resulting in a high-pressure liquid refrigerant in the vicinity of the outlet of the condenser.

The evaporator 62 evaporates the low-temperature refrigerant liquid to cool the inside of the refrigerator. The evaporator 62 has an air blower 62*a* for increasing efficiency of heat exchange, and a temperature sensor 62*b* for detecting the temperature inside the refrigerator.

In the refrigerator 209, the motor driving unit 60*b* controls the output of the linear vibration motor of the linear compressor 60*a* on the basis of the operating conditions of the refrigerator, i.e., the target temperature set on the refrigerator and the temperature inside the refrigerator.

Next, the operation will be described.

In the refrigerator 209, when a driving voltage Vd is supplied from the motor driving unit 60*b* to the linear vibration motor of the linear compressor 60*a*, the linear compressor 60*a* is operated and the refrigerant circulates in the refrigerant circulation path in the direction of arrow C, and thereby heat exchange is carried out in the condenser 61 and in the evaporator 62. Thus, the inside of the refrigerator is cooled.

To be specific, the refrigerant is liquefied in the condenser 61, and the flow rate of the refrigerant is reduced by the throttle 63 to expand the refrigerant, resulting in a low-temperature liquid refrigerant. When the low-temperature liquid refrigerant is sent to the evaporator 62, the low-temperature liquid refrigerant is evaporated in the evaporator 62, whereby the inside of the refrigerator is cooled. At this time, the air in the refrigerator is compulsory sent to the evaporator 62 by the air blower 62*a*, whereby heat exchange is efficiently carried out in the evaporator 62.

Further, in the refrigerator 209, the motor driving unit 60*b* controls the output of the linear vibration motor of the linear compressor 60*a* on the basis of the target temperature set on the refrigerator 209 and the temperature inside the refrigerator. Thereby, the temperature inside the refrigerator 209 is maintained at the target temperature.

As described above, in the refrigerator 209 according to the ninth embodiment, since the linear compressor 60*a* having the linear vibration motor as a power source is used as the compressor for compressing and circulating the refrigerant, friction loss in the compressor is reduced as compared with a refrigerator using a compressor having a rotation-type motor as a power source, and furthermore, sealability for sealing the refrigerant in the compressor is enhanced, resulting an increase in operation efficiency of the compressor, like in the air conditioner 208 of the eighth embodiment.

Furthermore, in the refrigerator 209, since friction loss in the compressor is reduced, the amount of waste oil (spent lubricating oil) and the amount of refrigerant to be filled in the compressor are reduced, as in the air conditioner 208 of the eighth embodiment. Therefore, the refrigerator 209 can contribute to conservation of global environment.

Moreover, in the air conditioner 209, the motor driving apparatus 60*b* calculates the motor thrust constant in the non-operating mode of the linear vibration motor and then calculates the position of the mover of the linear vibration motor using the calculated motor thrust constant in the operating mode of the linear vibration motor, like in the motor driving apparatus 207 according to the seventh embodiment. Therefore, it is possible to detect the position of the piston with high accuracy during the operation of the linear compressor 60a. Accordingly, the clearance between the piston and the cylinder head can be reduced, resulting in miniaturization of the linear compressor, which leads to miniaturization of the refrigerator.

[Embodiment 10]

Figure 18:
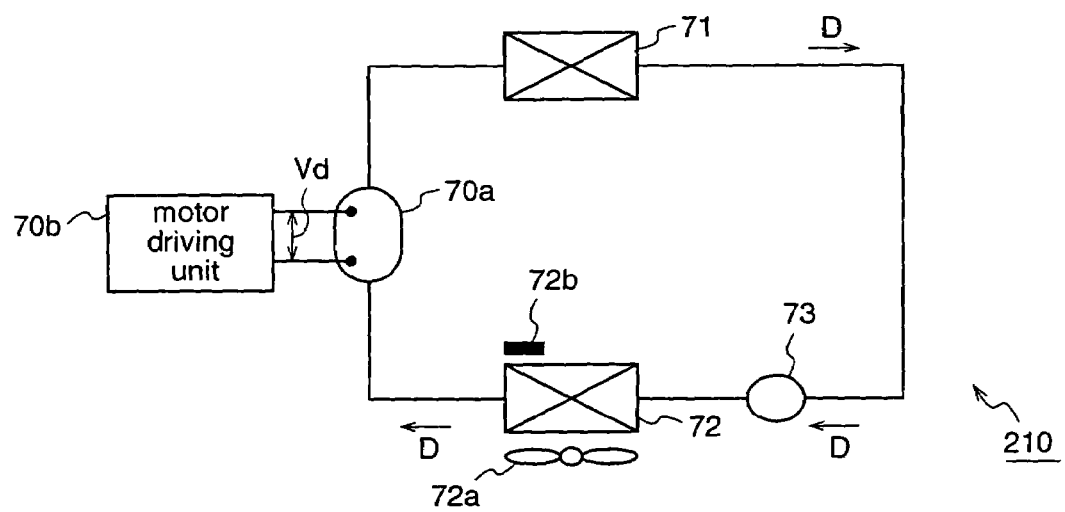
FIG. 18 is a schematic diagram for explaining a cryogenic freezer 210 according to a tenth embodiment of the present invention.

FIG. 18 is a block diagram for explaining a cryogenic freezer according to a tenth embodiment of the present invention.

A cryogenic freezer 210 according to the tenth embodiment has a freezing chamber (not shown), and cools the inside of the chamber at a cryogenic temperature (lower than −50° C.). As for objects to be frozen by the cryogenic freezer 210, there are electromagnetic circuit elements such as resistors, coils, magnets to be used as superconducting elements, electronic elements such as low-temperature reference parts for infrared sensors, medical objects such as blood and viscera, and foods such as tunas.

Electronic elements are preserved in the cryogenic states to increase their operating efficiencies or increase their sensitivities by removing thermal noises. As for foods, perishable foods are preserved in the cryogenic states to facilitate transportation, maintain freshness, or perform freeze-dry.

Although the freezing temperature of the cryogenic freezer 210 varies with applications, it is lower than −50° C. and, especially in applications for superconducting, the temperature varies over a wide range of 0~100K (Kelvin). For example, the freezing temperature of the cryogenic freezer 210 is set at about 50~100K in applications for high-temperature superconducting, and about 0~50K in applications for normal superconducting. Further, when the cryogenic freezer 210 is used for maintaining freshness of foods or the like, the freezing temperature is set at a little under −50° C.

Hereinafter, the cryogenic freezer 210 will be described in detail.

The cryogenic freezer 210 comprises a linear compressor 70a, a compressor driving unit 70b, a heat radiator 71, a heat storage 72, and a throttle 73.

The linear compressor 70a, the heat radiator 71, the throttle 73, and the heat storage 72 form a refrigerant circulation path. The compressor driving unit 70b is a motor driving unit for driving and controlling a linear vibration motor as a driving source of the linear compressor 70a. The linear compressor 70a and the motor driving unit 70b are identical to the linear compressor 40 and the motor driving apparatus 207 according to the seventh embodiment, respectively.

The throttle 73 reduces the liquid refrigerant sent from the heat radiator 71 to the heat storage 72 to expand the refrigerant, like the throttle 53 of the eighth embodiment.

The heat radiator 71 condenses the high-temperature and high-pressure refrigerant gas flowing in it, and discharges heat of the refrigerant to the outside air, like the condenser 61 of the refrigerator 209 of the ninth embodiment.

The heat storage 72 evaporates the low-temperature refrigerant liquid to cool the inside of the freezing chamber, thereby to preserve the objects at the cryogenic temperature, like the evaporator 62 of the ninth embodiment. The heat storage 72 has a temperature sensor 72b for detecting the temperature of the objects. The heat storage 72 may have an air blower 72a for increasing efficiency of heat exchange as shown in FIG. 18.

In the cryogenic freezer 210, the motor driving unit 70b controls the output of the linear vibration motor of the linear compressor 70a on the basis of the operating conditions of the cryogenic freezer 210, i.e., the target temperature set on the cryogenic freezer 210 and the temperature of the objects to be frozen.

In the cryogenic freezer 210, when an AC voltage Vd is supplied from the motor driving unit 70b to the linear vibration motor of the linear compressor 70a, the linear compressor 70a is operated, and the refrigerant circulates in the refrigerant circulation path in the direction of arrow D, whereby heat exchange is carried out in the heat radiator 71 and the heat storage 72. Thereby, the inside of the freezing chamber is cooled, and the objects in the chamber are frozen.

That is, the refrigerant is liquefied in the heat radiator 71, and the flow rate of the refrigerant is reduced by the throttle 73 to expand the refrigerant, resulting in a low-temperature liquid refrigerant. When the low-temperature liquid refrigerant is sent to the heat storage 72, the liquid refrigerant is evaporated in the heat storage 72, whereby the freezing chamber is cooled.

Further, in the cryogenic freezer 210, the motor driving unit 70b controls the output of the linear vibration motor of the linear compressor 70a on the basis of the target temperature set on the cryogenic freezer 210 and the temperature of the object to be frozen. Thereby, in the cryogenic freezer 210, the temperature of the object to be frozen is maintained at the target temperature.

As described above, in the cryogenic freezer 210 according to the tenth embodiment, since the linear compressor 70a having the linear vibration motor as a power source is used as the compressor for compressing and circulating the refrigerant, friction loss in the compressor is reduced as compared with a cryogenic freezer using a compressor having a rotation-type motor as a power source, and furthermore, sealability for sealing the refrigerant in the compressor is enhanced, resulting an increase in operation efficiency of the compressor, as in the air conditioner 208 according to the eight embodiment.

Furthermore, in the cryogenic freezer 210, since friction loss in the compressor is reduced, the amount of waste oil (spent lubricating oil) and the amount of refrigerant to be filled in the compressor can be reduced, as in the air conditioner 208 of the eighth embodiment. Therefore, the freezer 210 can contribute to conservation of global environment.

Moreover, in the cryogenic freezer 210, the motor driving unit 70b calculates the motor thrust constant in the non-operating mode of the linear vibration motor and then calculates the position of the mover of the linear vibration motor using the calculated motor thrust constant in the operating mode of the linear vibration motor, like in the motor driving apparatus 207 according to the seventh embodiment. Therefore, it is possible to detect the position of the piston with high accuracy during the operation of the linear compressor 70a. Accordingly, the clearance between the piston and the cylinder head can be reduced, resulting in miniaturization of the linear compressor, which leads to miniaturization of the cryogenic freezer.

[Embodiment 11]

Figure 19:
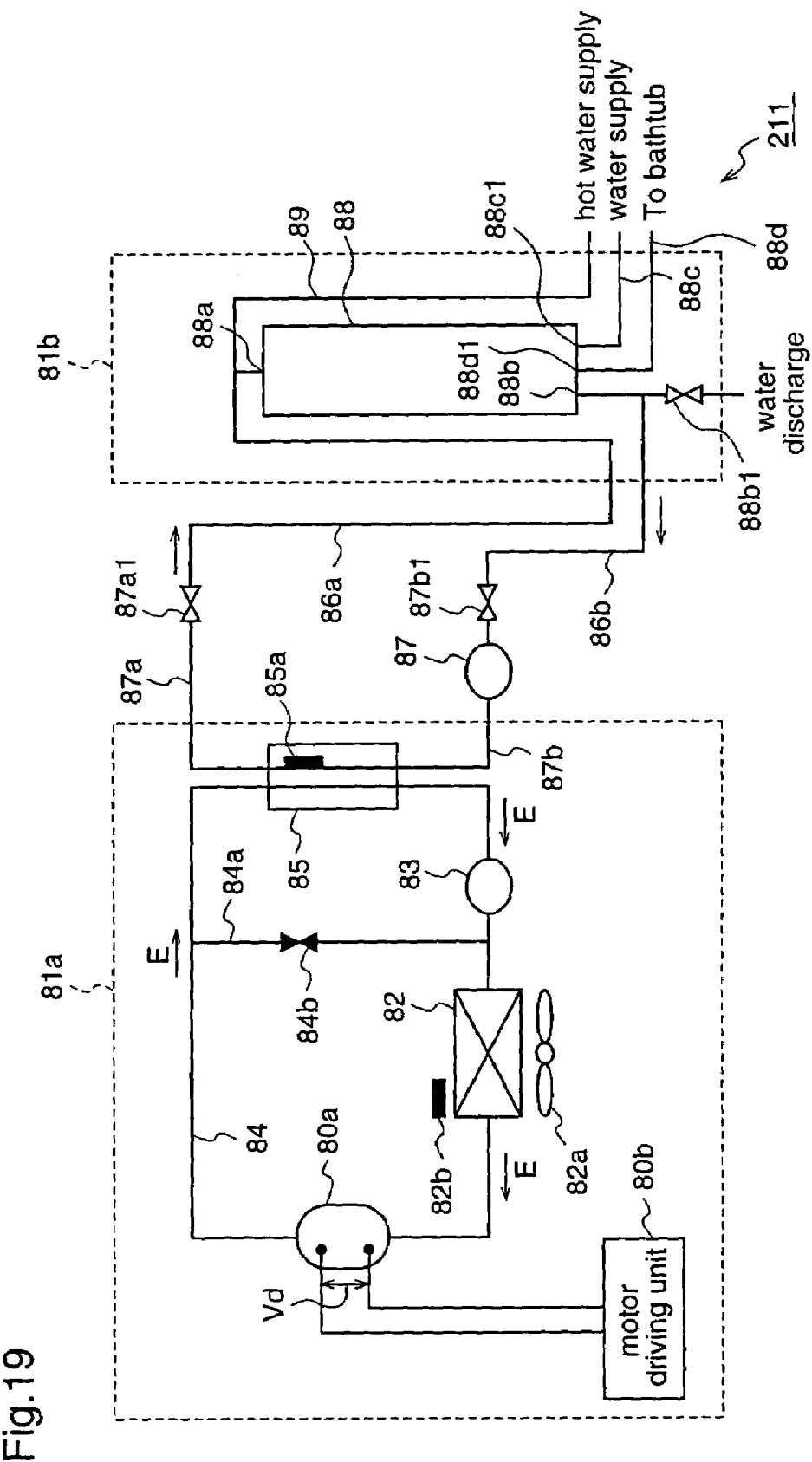
FIG. 19 is a schematic diagram for explaining a hot-water supply unit 211 according to an eleventh embodiment of the present invention.

FIG. 19 is a block diagram for explaining a hot-water supply unit according to an eleventh embodiment of the present invention.

A hot-water supply unit 211 according to the eleventh embodiment has a refrigeration cycle unit 81a for heating supplied water to discharge hot water, a hot-water storage 81b in which the hot water discharged from the refrigeration cycle unit 81a is stored, and pipes 86a, 86b, 87a, and 87b connecting the unit 81a and the storage 81b.

The refrigeration cycle unit 81a has a linear compressor 80a, a compressor driving unit 80b, an air-refrigerant heat exchanger 82, a throttle 83, and a water-refrigerant heat exchanger 85.

The linear compressor 80a, the air-refrigerant heat exchanger 82, the throttle 83, and the water-refrigerant heat exchanger 85 form a refrigerant circulation path.

The compressor driving unit 80b, drives a linear vibration motor (not shown) as a driving source of the linear compressor 80a. The linear compressor 80a is identical to the linear compressor 40 having the linear vibration motor 46 according to the seventh embodiment. Further, the compressor driving unit 80b, is identical in construction to the motor driving apparatus 207 of the seventh embodiment.

The throttle 83 reduces the flow rate of the liquid refrigerant sent from the water-refrigerant heat exchanger 85 to the air-refrigerant heat exchanger 82 to expand the liquid refrigerant, as in the throttle 53 of the air conditioner 208 according to the eighth embodiment.

The water-refrigerant heat exchanger 85 is a condenser for heating up the water supplied to the refrigeration cycle unit 81a, and has a temperature sensor 85a for detecting the temperature of the heated water. The air-refrigerant heat exchanger 82 is an evaporator for absorbing heat from the ambient atmosphere, and has an air blower 82a for increasing the efficiency of heat exchange and a temperature sensor 82b for detecting the ambient temperature.

In FIG. 19, reference numeral 84 denotes a refrigerant pipe for circulating the refrigerant along the refrigerant circulation path that is formed by the linear compressor 80a, the water-refrigerant heat exchanger 85, the throttle 83, and the air-refrigerant heat exchanger 82. A defrost bypass pipe 84a for supplying the refrigerant discharged from the linear compressor 80a to the air-refrigerant heat exchanger 82, bypassing the water-refrigerant heat exchanger 85 and the throttle 83, is connected to the refrigerant pipe 84, and a defrost bypass valve 84b is provided in a portion of the bypass pipe 84a.

The hot-water storage 81b has a hot-water storage tank 88 for storing water or hot water. A water supply pipe 88c for supplying water from the outside to the storage tank 88 is connected to a water intake port 88cl of the storage tank 88, and a hot-water supply pipe 88d for supplying hot-water from the storage tank 88 to a bathtub is connected to a hot-water discharge port 88dl of the storage tank 88. Further, a hot-water supply pipe 89 for supplying the hot water stored in the storage tank 88 to the outside is connected to a water intake/discharge port 88a of the storage tank 88.

The storage tank 88 and the water-refrigerant heat exchanger 85 of the refrigeration cycle unit 81a are connected by pipes 86a, 86b, 87a, and 87b, and a water circulation path is formed between the storage tank 88 and the water-refrigerant heat exchanger 85.

The water supply pipe 86b is a pipe for supplying water from the storage tank 88 to the water-refrigerant heat exchanger 85, and an end of this pipe is connected to a water discharge port 88b of the storage tank 88 while the other end is connected to a water intake side pipe 87b of the water-refrigerant heat exchanger 85 through a joint 87bl. Further, a discharge valve 88bl for discharging the water or hot water stored in the storage tank 88 is fixed to an end of the water supply pipe 86b. The water supply pipe 86a is a pipe for returning the water from the water-refrigerant heat exchanger 85 to the storage tank 88, and an end of this pipe is connected to the water intake/discharge port 88a of the storage tank 88 while the other end is connected to a discharge side pipe 87a of the water-refrigerant heat exchanger 85 through a joint 87al.

A pump 87 for circulating the water in the water circulation path is provided in a portion of the water intake side pipe 87b of the water-refrigerant heat exchanger 85.

Further, in the hot-water supply unit 211, the motor driving unit 80b, determines a motor output required of the linear vibration motor of the linear compressor 80a on the basis of the operating conditions of the hot-water supply unit, i.e., the target temperature of the hot water that is set on the hot-water supply unit, the temperature of the water supplied from the hot-water storage 81b to the water-refrigerant heat exchanger 85 of the refrigeration cycle unit 81a, and the outdoor temperature.

Next, the operation will be described.

When an AC voltage Vd from the motor driving unit 80b, is applied to the linear vibration motor (not shown) of the linear compressor 80a to operate the linear compressor 80a, the high-temperature refrigerant compressed by the linear compressor 80a circulates in the direction of arrow E, i.e., it passes through the refrigerant pipe 84, to be supplied to the water-refrigerant heat exchanger 85. Further, when the pump 87 in the water circulation path is driven, water is supplied from the storage tank 88 to the water-refrigerant heat exchanger 85.

In the water-refrigerant heat exchanger 85, heat exchange is carried out between the refrigerant and the water supplied from the storage tank 88, whereby heat moves from the refrigerant to the water. That is, the supplied water is heated, and the heated water is supplied to the storage tank 88. At this time, the temperature of the heated water is observed by the condensation temperature sensor 85a.

Further, in the water-refrigerant heat exchanger 85, the refrigerant is condensed by the above-mentioned heat exchange, and the flow rate of the condensed liquid refrigerant is reduced by the throttle 83, whereby the refrigerant is expanded and sent to the air-refrigerant heat exchanger 82. In the hot-water supply unit 211, the air-refrigerant heat exchanger 82 serves as an evaporator. That is, the air-refrigerant heat exchanger 82 absorbs heat from the outside air that is sent by the air blower 82b, thereby to evaporate the low-temperature liquid refrigerant. At this time, the temperature of the ambient atmosphere of the air-refrigerant heat exchanger 82 is observed by the temperature sensor 82b.

Further, in the refrigeration cycle unit 81a, when the air-refrigerant heat exchanger 82 is frosted, the defrost bypass valve 84b opens, and the high-temperature refrigerant is supplied to the air-refrigerant heat exchanger 82 through the defrost bypass line 84a. Thereby, the air-refrigerant heat exchanger 82 is defrosted.

On the other hand, the hot water is supplied from the water-refrigerant heat exchanger 85 of the refrigeration cycle unit 81a to the hot-water storage 81b through the pipes 87a and 86a, and the supplied hot water is stored in the storage tank 88. The hot water in the storage tank 88 is supplied to the outside through the hot-water supply pipe 89 as required. Especially when the hot water is supplied to a bathtub, the hot water in the storage tank 88 is supplied to the bathtub through a hot-water supply pipe 88*d* for the bathtub.

Further, when the amount of water or hot water stored in the storage tank 88 becomes lower than a predetermined amount, water is supplied from the outside through the water supply pipe 88*c*.

As described above, in the hot-water supply unit 211 according to the eleventh embodiment, since the linear compressor 80*a* having the linear vibration motor as a power source is used as the compressor for compressing and circulating the refrigerant in the refrigeration cycle unit 81*a*, friction loss in the compressor is reduced as compared with a hot-water supply unit using a compressor having a rotation-type motor as a power source, and furthermore, sealability for sealing the refrigerant in the compressor is enhanced, resulting an increase in operation efficiency of the compressor, like in the air conditioner 208 of the eighth embodiment.

Furthermore, in the hot-water supply unit 211, since friction loss in the compressor is reduced, the amount of waste oil (spent lubricating oil) and the amount of refrigerant to be filled in the compressor can be reduced, as in the air conditioner 208 of the eighth embodiment. Therefore, the hot-water supply unit 211 can contribute to conservation of global environment.

Moreover, in the hot-water supply unit 211, the motor driving unit 80*b*, calculates the motor thrust constant in the non-operating mode of the linear vibration motor and then calculates the position of the mover of the linear vibration motor using the calculated motor thrust constant in the operating mode of the linear vibration motor, like in the motor driving apparatus 207 according to the seventh embodiment. Therefore, it is possible to detect the position of the piston with high accuracy during the operation of the linear compressor 80*a*. Accordingly, the clearance between the piston and the cylinder head can be reduced, resulting in miniaturization of the linear compressor, which leads to miniaturization of the hot-water supply unit.

[Embodiment 12]

Figure 20:
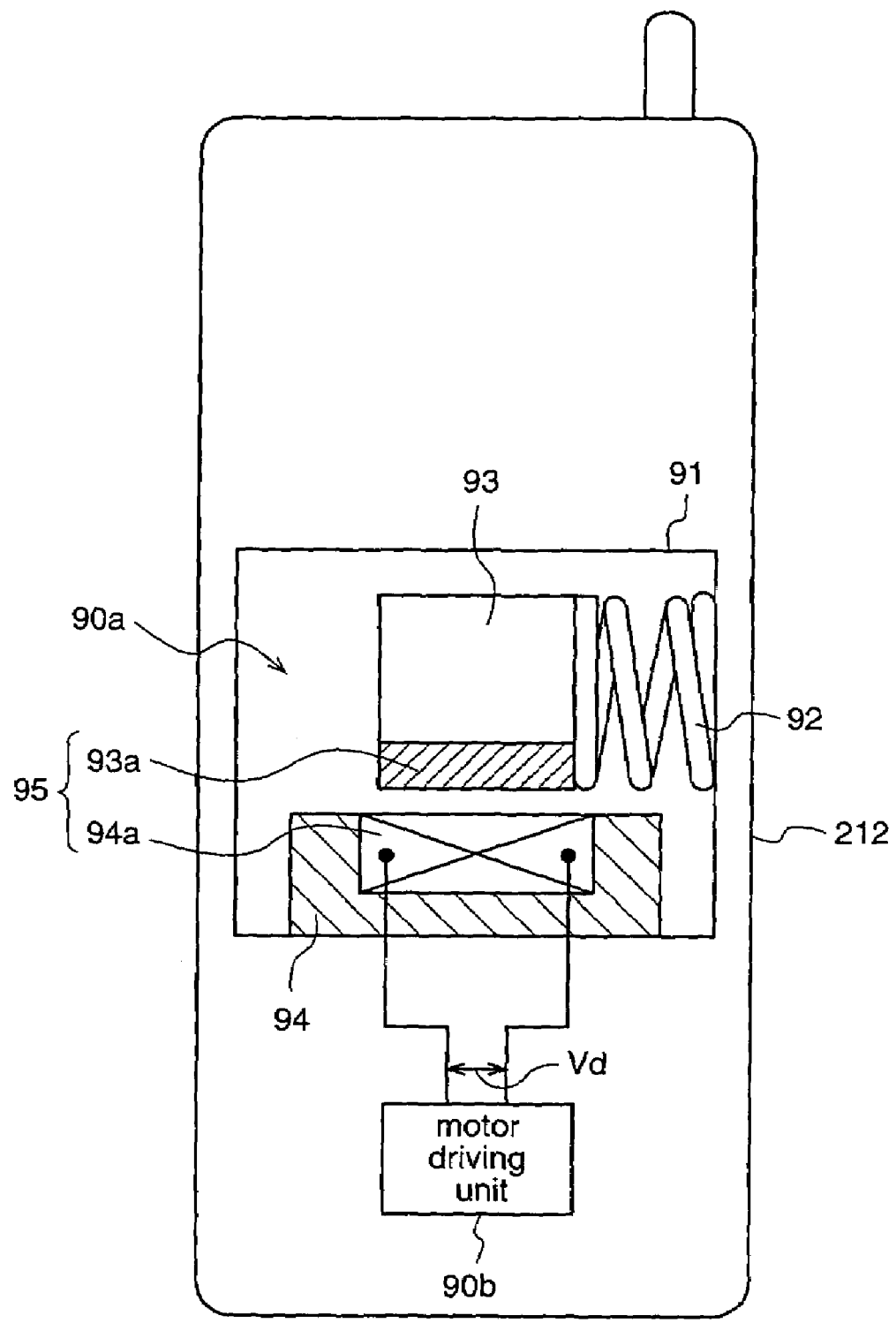
FIG. 20 is a schematic diagram for explaining a handy phone 212 according to a twelfth embodiment of the present invention.

FIG. 20 is a block diagram for explaining a handy phone according to a twelfth embodiment of the present invention.

A handy phone 212 of this twelfth embodiment has a vibrator 90*a* that mechanically vibrates, and a driving unit 90*b* for driving the vibrator 90*a*. The handy phone 212 informs an incoming call or the like to the user by vibration.

The vibrator 90*a* is provided with a weight member 93 that is placed in a case 91 and is vibratably supported by a spring member 92, a magnet 93*a* fixed to a portion of the weight member 93, and a stator 94 in which a coil 94*a* is embedded, which stator 94 is placed in the case 91 to be opposed to the magnet 93*a* of the weight member 93. A linear vibration motor 95 is constituted by the magnet 93*a* fixed to the weight member 93, and the coil 94*a* embedded in the stator 94. The weight member 93 and the magnet 93*a* constitute a mover of the linear vibration motor 95. In this linear vibration motor 95, the weight member 93 reciprocates in the expansion direction of the spring member 92 due to an electromagnetic power generated between the coil 94*a* and the magnet 93*a*, and elasticity of the spring member 92.

The driving unit 90*b* employs a battery (not shown) that is mounted on the handy phone 212 as a power supply and drives the linear vibration motor 95 of the vibrator 90*a*, and it is identical in construction to the motor driving apparatus 101*a* of the first embodiment.

In the handy phone 212 so constructed, when receiving a call, power is supplied from the motor drive unit 90*b* to the linear vibration motor 95 of the vibrator 90*a*, whereby the weight member 93 reciprocates in the expansion direction of the spring member 92, and the vibrator 90*a* vibrates.

That is, when the AC voltage Vd is applied to the coil 94*a*, an AC magnetic field is generated in the stator 94, and the magnetic field attracts the magnet 93*a*, whereby the magnet 93*a* and the weight member 93 to which the magnet 93*a* is fixed start to reciprocate.

As described above, in the handy phone 212 according to the twelfth embodiment, since mechanical vibration is generated by the linear vibration motor 95, the mechanical vibration can be varied with two degrees of freedom, i.e., the number of vibrations and the amplitude, as compared with the case where vibration is generated by a rotation-type motor, whereby the vibrator 91 which informs an incoming call or the like to the user by vibration can be provided with a variety of vibration patterns.

Further, in the handy phone 212 of the twelfth embodiment, the motor driving unit 90*b* calculates the motor thrust constant in the non-operating mode of the linear vibration motor and then calculates the position of the mover using the calculated motor thrust constant in the operating mode of the linear vibration motor, like in the motor driving apparatus 101*a* according to the first embodiment. Therefore, it is possible to detect the position of the mover with high accuracy during the operation of the linear vibration motor 95. Accordingly, the clearance between the mover and the case can be reduced, resulting in miniaturization of the linear vibration motor, which leads to miniaturization of the handy phone.

While in this twelfth embodiment the linear vibration motor and the driving apparatus thereof according to the first embodiment are used as a vibrator for informing an incoming call in a handy phone to the user by the vibrations and a driving apparatus thereof, respectively, the linear vibration motor and the driving apparatus according to the first embodiment may be used as a power source of a reciprocation-type electric razor and a driving apparatus thereof, respectively.

Moreover, while in the seventh to twelfth embodiments the motor driving units have the same construction as the motor driving apparatus 101*a* of the first embodiment, the motor driving units may have the same construction as any of the motor driving apparatuses 101*b* to 101*f* according to the second to sixth embodiments.

What is claimed is:

1. A motor driving apparatus for driving a linear vibration motor having a mover which is reciprocatably provided and a spring member which supports the mover, including:
   a motor driver having an operating mode for applying a driving voltage to the linear vibration motor so as to activate an operation of the motor, and a non-operating mode for applying a DC voltage to the linear vibration motor so as to generate a thrust of the mover;
   a thrust information output unit for outputting thrust information indicating the thrust of the mover, which is generated by the application of the DC voltage to the linear vibration motor;
   a thrust constant calculation unit for calculating a motor thrust constant of the linear vibration motor by performing an arithmetic operation of dividing the thrust indicated by the thrust information, by a DC current that is supplied to the linear vibration motor due to the application of the DC voltage to the linear vibration motor; and a mover position calculation unit for performing position calculation for obtaining the position of the mover on the basis of the calculated motor thrust constant.

2. The motor driving apparatus as defined in claim 1 further including:
a moving distance detection unit for detecting a distance by which the mover has moved as a result of the application of the DC voltage to the linear vibration motor, and
said thrust information output unit deciding the mover thrust that is generated by the application of the DC voltage to the linear vibration motor, according to an arithmetic operation of multiplying the moving distance of the mover detected by the moving distance detection unit, by a spring constant of the spring member, and outputting thrust information which indicates the decided mover thrust.

3. The motor driving apparatus as defined in claim 1 further including:
a mover position detection unit that, when the mover has arrived at a prescribed position that is a predetermined distance away from a neutral position in which a spring force of the spring member does not act on the mover, outputs a detection signal indicating that the mover has arrived at the prescribed position, wherein
when receiving the detection signal, said thrust information output unit outputs the thrust information indicating the mover thrust that is balanced with the spring force of the spring member, which is generated by the application of the DC voltage to the linear vibration motor and acts on the mover that is located at the prescribed position.

4. The motor driving apparatus as defined in any of claims 1 to 3 wherein
said motor driver temporarily changes its mode to the non-operating mode at a start of the operation of the linear vibration motor so as to calculate the motor thrust constant, and
said mover position calculation unit performs the position calculation for obtaining the mover position during the operation of the linear vibration motor using the motor thrust constant calculated in the non-operating mode at the start of the operation of the linear vibration motor.

5. The motor driving apparatus as defined in any of claims 1 to 3 wherein
said motor driver temporarily changes its mode to the non-operating mode at an end of the operation of the linear vibration motor so as to calculate the motor thrust constant, and
said mover position calculation unit performs the position calculation for obtaining the mover position during the operation of the linear vibration motor using the motor thrust constant calculated in the non-operating mode at the end of the previous operation.

6. The motor driving apparatus as defined in any of claims 1 to 3 further including:
a temperature detection unit for detecting a temperature of the linear vibration motor; and
a motor thrust constant estimation unit for estimating a motor thrust constant that is used at the position calculation for obtaining the mover position during the operation of the linear vibration motor, on the basis of the motor thrust constant calculated by the thrust constant calculation unit and the temperature detected by the temperature detection unit, wherein
said motor driver temporarily changes its mode to the non-operating mode at a start or end of the operation of the linear vibration motor, or at the start and end of the operation, so as to calculate the motor thrust constant,
said motor thrust constant estimation unit,
when the linear vibration motor is not operating, derives a relationship between the temperature of the linear vibration motor and the motor thrust constant on the basis of the motor thrust constant calculated in the non-operating mode and the temperature at that calculation of the motor thrust constant, detected by the temperature detection unit, and
when the linear vibration motor is operating, estimates the motor thrust constant in the operating state of the linear vibration motor, from the derived relationship between the temperature of the linear vibration motor and the motor thrust constant on the basis of the temperature detected by the temperature detection unit, and
said mover position calculation unit performs the position calculation for obtaining the mover position during the operation of the linear vibration motor, using the estimated motor thrust constant.

7. An air conditioner provided with a compressor which has a cylinder and a piston, and compresses a liquid in the cylinder by a reciprocating motion of the piston, including:
a linear vibration motor for making the piston reciprocate, having a mover which is reciprocatably provided, and a spring member which supports the mover;
a motor driving unit for driving the linear vibration motor; and
said motor driving unit being a motor driving apparatus as defined in any of claims 1 to 6.

8. A refrigerator provided with a compressor which has a cylinder and a piston, and compresses a liquid in the cylinder by a reciprocating motion of the piston, including:
a linear vibration motor for making the piston reciprocate, having a mover which is reciprocatably provided, and a spring member which supports the mover;
a motor driving unit for driving the linear vibration motor; and
said motor driving unit being a motor driving apparatus as defined in any of claims 1 to 6.

9. A cryogenic freezer provided with a compressor which has a cylinder and a piston, and compresses a liquid in the cylinder by a reciprocating motion of the piston, including:
a linear vibration motor for making the piston reciprocate, having a mover which is reciprocatably provided, and a spring member which supports the mover;
a motor driving unit for driving the linear vibration motor; and
said motor driving unit being a motor driving apparatus as defined in any of claims 1 to 6.

10. A hot-water supply unit provided with a compressor which has a cylinder and a piston, and compresses a liquid in the cylinder by a reciprocating motion of the piston, including:
a linear vibration motor for making the piston reciprocate, having a mover which is reciprocatably provided, and a spring member which supports the mover;

a motor driving unit for driving the linear vibration motor; and said motor driving unit being a motor driving apparatus as defined in any of claims 1 to 6.

11. A handy phone provided with a linear vibration motor for generating vibration, and a motor driving unit for driving the linear vibration motor, including:

said linear vibration motor having a mover which is reciprocatably provided, and a spring member which supports the mover; and said motor driving unit being a motor driving apparatus as defined in any of claims 1 to 6.

* * * * *